US012739956B2

(12) United States Patent
Bardio et al.

(10) Patent No.: US 12,739,956 B2
(45) **Date of Patent: *Sep. 15, 2026**

(54) AUTOMATIC CONFIGURATION OF A CONTROL MODULE FOR A LIGHTING FIXTURE

(71) Applicant: Lutron Technology Company LLC, Coopersburg, PA (US)

(72) Inventors: Jessica Bardio, Somerville, MA (US); Andrew Karl Cooney, Boynton Beach, FL (US); Alexander S. Petersen, Bethlehem, PA (US)

(73) Assignee: Lutron Technolgy Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/917,522

(22) Filed: Oct. 16, 2024

(65) Prior Publication Data

US 2025/0040018 A1 Jan. 30, 2025

Related U.S. Application Data

(63) Continuation of application No. 17/971,281, filed on Oct. 21, 2022, now Pat. No. 12,156,311.

(Continued)

(51) Int. Cl.
*H05B 47/10* (2020.01)
*H05B 47/115* (2020.01)
(Continued)

(52) U.S. Cl.
CPC ......... *H05B 47/115* (2020.01); *H05B 47/155* (2020.01); *H05B 47/185* (2020.01)

(58) Field of Classification Search
CPC .. H05B 47/105; H05B 47/115; H05B 47/125; H05B 47/155; H05B 47/175; H05B 47/185
See application file for complete search history.

(56) References Cited

U.S. PATENT DOCUMENTS

| | | | |
|---|---|---|---|
| 6,710,546 | B2 | 3/2004 | Crenshaw |
| 8,072,164 | B2 | 12/2011 | Ilyes et al. |

(Continued)

FOREIGN PATENT DOCUMENTS

| | | | |
|---|---|---|---|
| WO | 2016170074 | A1 | 10/2016 |
| WO | 2021237167 | A2 | 11/2021 |

*Primary Examiner* — Tung X Le
(74) *Attorney, Agent, or Firm* — Flaster Greenberg P.C.

(57) ABSTRACT

A control module may control a control device of a load control system. The control module may include a connector that can be coupled to the control device for receiving power and communicating with the control device. The control module may include a first wired communication circuit may be coupled to the third and fourth electrical terminals and configured to communicate with the control device when the control module is coupled to the control device using a four-wire topology. The control module may include a second wired communication circuit may be coupled to the first and second electrical terminals and configured to communicate with the control device when the control module is coupled to the control device using a two-wire topology. The control circuit may be configured to determine whether to communicate with the control device using the first wired communication circuit or the second wired communication circuit.

20 Claims, 11 Drawing Sheets

Related U.S. Application Data

(60) Provisional application No. 63/262,931, filed on Oct. 22, 2021.

(51) Int. Cl.

| | |
|---|---|
| ***H05B 47/155*** | (2020.01) |
| ***H05B 47/185*** | (2020.01) |

(56) References Cited

U.S. PATENT DOCUMENTS

| | | | | |
|---|---|---|---|---|
| 8,212,485 | B2 | 7/2012 | Elek et al. | |
| 9,370,057 | B2 | 6/2016 | Saes et al. | |
| 9,595,880 | B2 | 3/2017 | Knode et al. | |
| 9,686,842 | B1 | 6/2017 | Coombes et al. | |
| 10,398,007 | B2 | 8/2019 | Pearson et al. | |
| 10,616,968 | B2 * | 4/2020 | Wang | H05B 45/31 |
| 10,851,950 | B2 | 12/2020 | Bosua et al. | |
| 11,219,108 | B1 * | 1/2022 | King | H01R 13/70 |
| 11,460,874 | B1 | 10/2022 | King et al. | |
| 2011/0236034 | A1 | 9/2011 | Schenk et al. | |
| 2012/0025717 | A1 | 2/2012 | Klusmann et al. | |
| 2014/0265935 | A1 | 9/2014 | Sadwick et al. | |
| 2015/0048758 | A1 | 2/2015 | Carrigan et al. | |
| 2015/0048762 | A1 | 2/2015 | Yang et al. | |
| 2019/0141818 | A1 | 5/2019 | Pearson et al. | |
| 2019/0239324 | A1 | 8/2019 | Harris | |
| 2020/0300037 | A1 | 9/2020 | Blair et al. | |
| 2021/0307148 | A1 | 9/2021 | Leizerovich | |
| 2022/0201825 | A1 * | 6/2022 | Cohen | H05B 45/10 |
| 2024/0276614 | A1 * | 8/2024 | Kumar | H05B 45/20 |

* cited by examiner

AUTOMATIC CONFIGURATION OF A CONTROL MODULE FOR A LIGHTING FIXTURE

CROSS-REFERENCE TO RELATED APPLICATIONS

This application is a continuation of U.S. Non-Provisional patent application Ser. No. 17/971,281, filed Oct. 21, 2022, which claims the benefit of U.S. Provisional Patent Application No. 63/262,931, filed Oct. 22, 2021, the contents of which are incorporated herein by reference in their entirety.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and air-conditioning (HVAC) system may be used to control the temperature in the user environment.

Each load control system may include various control devices, including input devices and load control devices. The load control devices may receive digital messages, which may include load control instructions, for controlling an electrical load from one or more of the input devices. The load control devices may receive the digital messages via radio frequency (RF) signals. Each of the load control devices may be capable of directly controlling an electrical load. The input devices may be capable of indirectly controlling the electrical load via digital messages transmitted to the load control device.

The load control system may have various types of load control devices installed therein, such as lighting control devices (e.g., dimmer switches, electronic switches, ballasts, or light-emitting diode (LED) drivers), motorized window treatments, temperature control devices (e.g., a thermostat), alternating-current (AC) plug-in load control devices, and/or the like. The load control system may also have various input devices installed therein, such as remote control devices, occupancy sensors, daylight sensors, temperature sensors, and/or the like. The greater the number of load control devices and input devices in a load control environment, the less aesthetically pleasing the load control environment may be to a user.

Implementing each of these load control devices and input devices separately in a load control environment can cause a large number of devices to be installed and configured in the load control system. As these load control devices and input devices generally communicate via wireless signals, such as radio-frequency (RF) signals, the implementation of multiple input devices for controlling a number of load control devices can cause increased network traffic, which increases the chances of network inefficiencies. Additionally, the communication of sensed information via RF signals may cause a delay in the time it takes to control an electrical load in response to the sensed information.

SUMMARY

A control module may be configured to control a control device of a load control system. The control device may be configured to control an electrical load. The control module may include a connector, a first and second wired communication circuit, a control circuit, and a power supply. The connector may be configured to be coupled to the control device for receiving power and communicating with the control device. The connector may comprise a first electrical terminal, a second electrical terminal, a third electrical terminal, and a fourth electrical terminal. The first wired communication circuit may be coupled to the third and fourth electrical terminals and configured to communicate with the control device (e.g., when the control module is coupled to the control device using a four-wire topology). The second wired communication circuit may be coupled to the first and second electrical terminals and configured to communicate with the control device (e.g., when the control module is coupled to the control device using a two-wire topology). The two-wire topology may be defined by both power and communication being provided via the first and second electrical terminals. The four-wire topology may be defined by power being provided via the first and second electrical terminals, and communication being provided via the third and fourth electrical terminals.

When the control module is coupled to the control device using the four-wire topology, the control module may be configured to receive power via the first and second electrical terminals and configured to communicate with the control device using the first wired communication circuit via the third and fourth electrical terminals. When the control module is coupled to the control device using the two-wire topology, the control module may be configured to receive power via the first and second electrical terminals and configured to communicate with the control device using the second wired communication circuit via the first and second electrical terminals. The control circuit may be configured to disable the first wired communication circuit when the control module is coupled to the control device using the two-wire topology, and may be configured to disable the second wired communication circuit when the control module is coupled to the control device using the four-wire topology.

The control circuit may be configured to control the control device. The power supply may be configured to receive power via the first and second electrical terminals and generate a supply voltage for powering the control circuit. The control circuit may be configured to determine whether to communicate with the control device using the first wired communication circuit or the second wired communication circuit. For example, to determine whether the control module is coupled to the control device using the two-wire topology or the four-wire topology, the control circuit may be configured to generate a test signal. For instance, the control circuit may control a magnitude of a voltage at the first and second electrical terminals using the second wired communication circuit to generate a test signal. The control circuit may determine whether to communicate with the control device using the first wired communication circuit or the second wired communication circuit based on the magnitude of the voltage at the first and second electrical terminals during or after the test signal. For instance, the control circuit may be configured to short the first and second electrical terminals to control the magnitude of the voltage at the first and second electrical terminals (e.g., the voltage at the first and second electrical terminals may be in an idle-high state). The control circuit may be configured to receive a response message from the control device, and determine to communicate with the control device using the second wired communication circuit based on the reception of the response. The test signal may comprise a query message. The control circuit may be configured to wait a predetermined period of time after the generation of the test signal for a response message from the control device, and may be configured to determine to communicate with the control device using the first wired communication circuit in response to a determination that the response message was not received within the predetermined period of time.

The control circuit is configured to determine to communicate with the control device using the first wired communication circuit when the generation of the test signal causes the control module to lose power. For example, the control circuit may be configured to set a test attempt flag prior to controlling the magnitude of the voltage at the first and second electrical terminals, and in response to powering on, the control circuit may be configured to determine whether the test attempt flag indicates that the control circuit had lost power in response to the generation of the test signal using the second wired communication circuit. Further, the control circuit may be configured to set a configured flag that indicates whether to communicate with the control device using the first wired communication circuit or the second wired communication circuit.

Methods, systems, and devices are described herein for controlling a control device of a load control system, where the control device is configured to control an electrical load. The control module may include a plurality of electrical terminals, such as a first electrical terminal, a second electrical terminal, a third electrical terminal, and a fourth electrical terminal. The control module may include a first wired communication circuit coupled to the third and fourth electrical terminals and configured to communicate with the control device. The control module may include a second wired communication circuit coupled to the first and second electrical terminals and configured to communicate with the control device. The control module may include a power supply configured to receive power via the first and second electrical terminals and generate a supply voltage for powering a control circuit of the control module.

In some examples, the control circuit may be configured to generate a test signal across the first and second electrical terminals using the second wired communication circuit, and determine whether to communicate with the control device using the first wired communication circuit or the second wired communication circuit based on a test response across the first and second electrical terminals resulting from the generation of the test signal.

In some examples, the control circuit may be configured to control a magnitude of a voltage across the first and second electrical terminals using the second wired communication circuit, and determine whether to communicate with the control device using the first wired communication circuit or the second wired communication circuit based on a response caused by the control of the magnitude of the voltage across the first and second electrical terminals.

The test response may be indicated by a magnitude of a voltage across the first and second electrical terminals, a loss of power at the control module, and/or a reception of a response message via the first and second electrical terminals.

DETAILED DESCRIPTION

Figure 1:
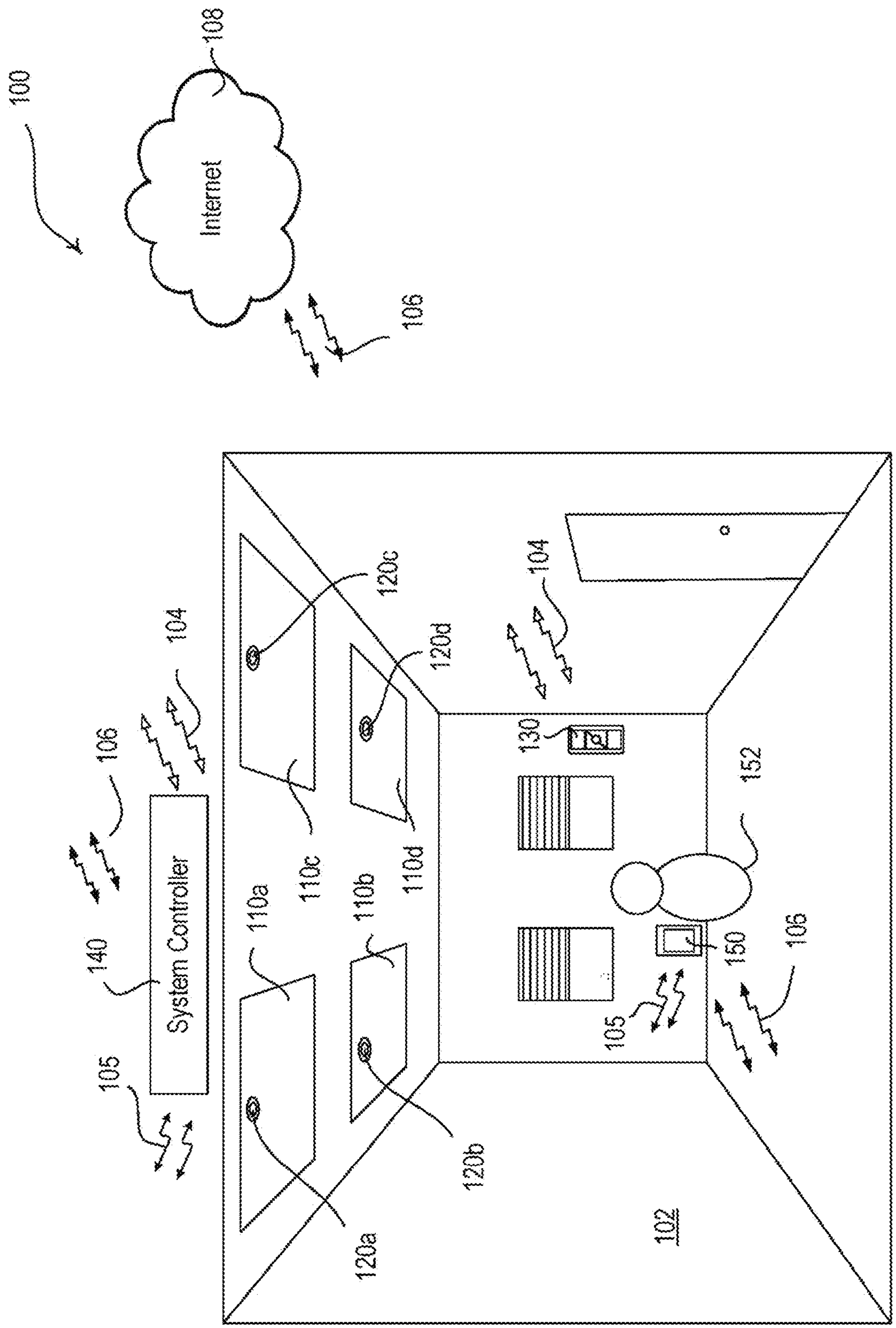
FIG. 1 is a diagram of an example load control system.

FIG. 1 is a diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 104, 105. For example, the control-source devices, control-target devices, and/or the system controller 110 may be configured to transmit and receive the RF signals 104, 105. The RF signals 104, 105 may use a proprietary RF protocol, such as the CLEAR CONNECT protocol (e.g., the CLEAR CONNECT TYPE A protocol and/or the CLEAR CONNECT TYPE X protocol). Alternatively, the RF signals 104, 105 may be transmitted using a different RF protocol, such as, a standard protocol, for example, one of WI-FI, BLUETOOTH, BLUETOOTH LOW ENERGY (BLE), ZIGBEE, Z-WAVE, THREAD, KNX-RF, ENOCEAN RADIO protocols, or a different standard or proprietary protocol. Alternatively or additionally, the load control system 100 may comprise a wired digital communication link coupled to one or more of the control devices to provide for communication between the control devices.

The control devices of the load control system 100 may comprise a number of control-source devices (e.g., input devices operable to transmit messages in response to receiving user inputs, detecting occupancy/vacancy conditions, measuring light intensity, etc.) and a number of control-target devices (e.g., load control devices operable to receive messages and control electrical loads in response to the received messages). A single control device of the load control system 100 may operate as both a control-source and a control-target device. For example, the control-source device may be an originating device or intermediary device from which a message is originated and a control-target device may be a destination device or intermediary device to which the message is transmitted.

The lighting control system 100 may comprise one or more lighting fixtures 110*a*, 110*b*, 110*c*, 110*d* that may be installed in the room 102 (e.g., in the ceiling of the room). Each lighting fixture 110*a*-110*d* may include a lighting load (e.g., an LED light source) and a respective lighting control device (e.g., an LED driver, ballast, dimming or switching module, or any combination of such devices) for controlling the respective lighting load of the lighting fixture 110*a*-110*d*. The lighting control devices may be control-target devices capable of controlling a respective lighting load in response to control instructions received in digital messages.

The control-source devices of the load control system 100 may be used to control the lighting fixtures 110*a*-110*d*. The control-source devices may be input devices capable of communicating messages (e.g., digital messages) to the control-target devices of the load control system 100, such as the lighting control devices in the lighting fixtures 110*a*-110*d*, e.g., via the RF signals 104, 105. The control-source devices may transmit the messages for controlling (e.g., indirectly controlling) the amount of power provided to the lighting loads by the respective lighting control devices in the respective lighting fixtures 110*a*-110*d*. The messages may include control instructions (e.g., load control instructions) or another indication that causes the lighting control devices to determine load control instructions for controlling the respective lighting loads. The control-sources devices of the load control system 100 may comprise, for example, a remote control device 130, which may be configured to transmit messages to the lighting control devices in the respective lighting fixture 100*a*-110*d* via the RF signals 104 in response to actuations of one or more buttons of the remote control device 130. For example, the remote control device 130 may be battery-powered.

The load control system 100 may include control modules (e.g., sensor devices and/or fixture controllers), such as control modules 120*a*, 120*b*, 120*c*, 120*d*. The control modules 120*a*-120*d* may each be attached to one of the lighting fixture 110*a*-110*d*. The control modules 120*a*-120*d* may each be electrically connected to a respective lighting control device within the lighting fixtures 110*a*-110*d* for controlling lighting loads. The control modules 120*a*-120*d* may include one or more sensors (e.g., sensing circuits) for controlling the lighting loads within the respective lighting fixtures 110*a*-110*d*. For example, the control modules 120*a*-120*d* may include an occupancy sensor (e.g., an occupancy sensing circuit) and/or a daylight sensor (e.g., a daylight sensing circuit). The control modules 120*a*-120*d* may be control-source devices that transmit digital messages to respective lighting control devices to which they are connected (e.g., on a wired communication link). The control modules 120*a*-120*d* may also, or alternatively, be control-target devices for receiving digital messages from other devices in the system, such as the remote control device 130 or another control-source device, (e.g., on a wireless communication link via the RF signals 104, 105) for controlling the respective lighting control devices to which the control modules 120*a*-120*d* are connected.

The occupancy sensors in the control modules 120*a*-120*d* may be configured to detect occupancy and/or vacancy conditions in the room 102 in which the control modules 120*a*-120*d* are load control system 100 is installed. The control modules 120*a*-120*d* may control the lighting control devices in the respective lighting fixtures 110*a*-110*d* in response to the occupancy sensors detecting the occupancy or vacancy conditions. The occupancy sensor may operate as a vacancy sensor, such that messages are transmitted in response to detecting a vacancy condition (e.g., messages may not be transmitted in response to detecting an occupancy condition). The daylight sensors in the control modules 120*a*-120*d* may be configured to measure a total intensity level of light (e.g., ambient light) in the visible area of the room 102 in which the control modules 120*a*-120*d* are installed. The control modules 120*a*-120*d* may control the lighting control devices in the respective lighting fixture 110*a*-121*d* in response to the intensity level of the light measured by the respective daylight sensor.

The control modules 120*a*-120*d* may each comprise a memory or other computer-readable storage medium capable of storing instructions thereon for being executed by the control circuit. Each control module 120*a*-120*d* may store in the memory unique identifiers of other devices in the load control system 100 with which the control module is associated to enable recognition of messages from and/or transmission of messages to associated control devices. For example, each control module 120*a*-120*d* may store in the memory the unique identifier of the remote control device 130 with which the control module is associated.

The control modules 120*a*-120*d* may each comprise one or more wireless communication circuits for transmitting and/or receiving messages, e.g., via the RF signals 104, 105. A first wireless communication circuit of each of the control modules 120*a*-120*d* may be capable of communicating on a first wireless communication link (e.g., a wireless network communication link) and/or communicating using a first wireless protocol (e.g., a wireless network communication protocol, such as the CLEAR CONNECT and/or THREAD protocols), via the RF signals 104. A second wireless communication circuit of each of the control modules 120*a*-120*d* may be capable of communicating on a second wireless communication link (e.g., a short-range wireless communication link) and/or communicating using a second wireless protocol (e.g., a short-range wireless communication protocol, such as the BLUETOOTH and/or BLUETOOTH LOW ENERGY (BLE) protocols), via the RF signals 105.

The control modules 120*a*-120*d* may each comprise one or more wired communication circuits for transmitting and/or receiving signals and/or messages via respective wired communication links. For example, each control module 120*a*-120*d* may transmit and/or receive messages via the wired communication circuit on a wired power/communication link in the respective lighting fixture 110*a*-110*d*. The wired power/communication link may be used for providing communications and/or power within each of the lighting fixtures 110*a*-110*d*. For example, the wired power/communication link may comprise, for example, a Digital Addressable Lighting Interface (DALI) link or another digital communication link. The wired power/communication link in each lighting fixture 110*a*-110*d* may be used by the respective control module 120*a*-120*d* to transmit messages (e.g., including commands) to the respective lighting control devices for controlling the intensity level and/or color of the respective lighting loads. Each control module 120*a*-120*d* may receive messages (e.g., including feedback information) from the respective lighting control device that indicate the intensity level and/or color of the respective lighting loads. In addition, the lighting control devices in each of the lighting fixtures 110*a*-110*d* may each receive power from an AC power source (not shown) and may each supply power to the respective control module 120*a*-120*d* via the wired power/communication link 120. Though the wired power/communication link may be described herein as a single link, the wired power/communication link may be comprised of multiple links. For example, the lighting control devices of each lighting fixture 110*a*-110*d* may provide power to the respective control module 120*a*-120*d* via a two-wire power bus, while communications may be performed between the control module and the lighting control devices 124 using an analog communication link, such as a 0-10V control link or another communication link through which power may not be provided (e.g., an RS-485 digital communication link).

The load control environment 100 may include a system controller 140 operable to transmit and/or receive messages via wired and/or wireless communications. For example, the system controller 140 may be configured to transmit and/or receive the RF signals 104, to communicate with one or more control devices (e.g., control-source devices and/or control-target devices, such as the control modules 120*a*-120*d*). The system controller 140 may communicate digital messages between associated control devices. The system controller 140 may be coupled to one or more wired control devices (e.g., control-source devices and/or control-target devices) via a wired digital communication link. The system controller 140 may also, or alternatively, be capable of communicating on a third wireless communication link (e.g., a standard communication link) and/or communicating using a third wireless protocol (e.g., a standard communication protocol, such as the Internet protocol (IP) and/or WI-FI protocol), via RF signals 106. For example, the system controller 140 may be configured to transmit and/or received messages on a network 108, such as the Internet, via the RF signals 106.

The system controller 140 may be configured to transmit and receive messages between control devices. For example, the system controller 140 may transmit messages to the control modules 120*a*-120*d* for controlling the lighting loads in the lighting fixtures 110*a*-110*d* in response to the messages received from the remote control device 130 (e.g., via the RF signals 104). The messages may include configuration data for configuring the control devices (e.g., the control modules 120*a*-120*d*) and/or control data (e.g., commands) for controlling the lighting loads in the lighting fixtures 110*a*-110*d*.

The load control system 100 may be commissioned to enable control of the lighting loads in the lighting fixtures 110*a*-110*d* based on commands communicated from the control devices (e.g., the remote control device 130) to the control modules 120*a*-120*d* for controlling the lighting loads in the lighting fixtures 110*a*-110*d*. For example, the remote control device 130 may be associated with the control modules 120*a*-120*d* within the lighting fixtures 110*a*-110*d*. Association information may be stored on the associated devices, which may be used to communicate and identify messages and/or commands at associated devices for controlling electrical devices in the load control system 100. The association information may include the unique identifier of one or more of the associated devices. The association information may be stored at the control modules 120*a*-120*d*, the system controller 140, or at other control devices that may be implemented to enable communication and/or identification of messages between the control devices.

A network device 150 may be in communication with the control modules 110*a*-110*d* and/or the system controller 140 for commissioning and/or controlling the control devices of the load control system 100. The network device 150 may comprise a wireless phone, a tablet, a laptop, a personal digital assistant (PDA), a wearable device (e.g., a watch, glasses, etc.), or another computing device. The network device 150 may be operated by a user 152. The network device 150 may be configured to communicate with the system controller 140 and/or control devices connected to the network 108 by transmitting and/or receiving messages using a standard wireless protocol (e.g., via the RF signals 108). In addition, the network device 150 may be configured to communicate with the control modules 110*a*-110*d* by transmitting and/or receiving messages via the short-range wireless communication link (e.g., using the RF signals 106). Further, the network device 150 may be configured to transmit and/or receive beacon signals that may be used to commission the load control system 100 via the short-range wireless communication link (e.g., using the RF signals 106).

Figure 2:
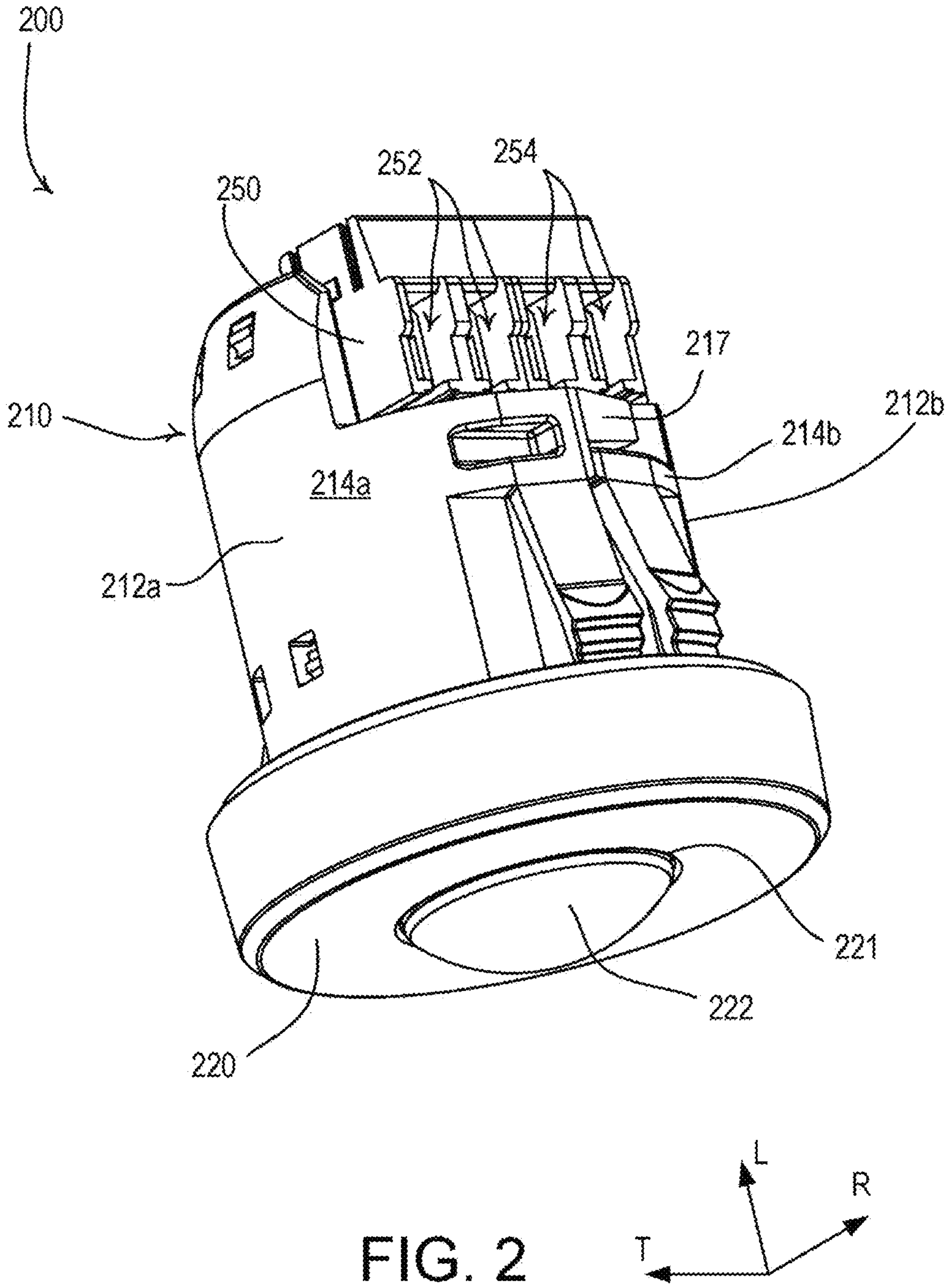
FIG. 2 is a perspective view depicting an example control module that may be installed in a lighting fixture of the load control system of FIG. 1

FIG. 2 is a perspective view depicting an example control module 200 (e.g., a sensor module), which may be deployed as the control modules 120*a*-120*d* for the load control system 100 shown in FIG. 1. The control module 200 may be configured to be attached (e.g., mounted) to a lighting fixture (e.g., the lighting fixtures 110*a*-110*d*) and electrically connected to different types of lighting control devices, such as different types of LED drivers, for example. The control module 200 may be electrically connected to the lighting control device (e.g., via a wired communication link and/or control link) to enable control of the lighting control device in response to information provided from the control module 200. The control module 200 may comprise an enclosure 210 configured to be received in an opening (e.g., a circular opening) of the lighting fixture. For example, the enclosure 210 may have a cylindrical shape and may extend in a longitudinal direction L. The enclosure 210 may each comprise one or more clips 212 for mounting the control module 200 to the lighting fixture (e.g., within the fixture opening).

The control module 200 may comprise a cover portion 220 (e.g., a bezel) configured to cover the opening in the lighting fixture in which the control module 200 is mounted. The control module 200 may further comprise a lens 222 received in an opening 221 of the cover portion 220. When the opening is located in a bottom surface of the lighting fixture, the cover portion 220 and the lens 222 may be directed towards the floor. The lens 222 may be domed-shaped and made of at least a partially infrared or visible light transparent material to allow infrared energy to enter the enclosure 210 through the opening 221. The control module 200 may comprise an occupancy detection circuit having a detector (e.g., a sensor). For example, the occupancy detection circuit may comprise a passive infrared (PIR) sensing circuit, and the detector may comprise a pyroelectric detector. The detector may be configured to detect infrared energy from an occupant in the load control environment that enters the control module 200 through then opening 221 of the cover portion 220 (e.g., through the lens 222). The control module 200 may be configured to detect motion in the load control environment (e.g., occupancy and/or vacancy conditions) in response to the infrared energy detected by the detector. When the opening is located in a bottom surface of the lighting fixture, the control module 200 may be configured to detect occupancy and/or vacancy conditions in the load control environment beneath the lighting fixture to which the control module 200 is attached.

The control module 200 may comprise a connector 250 that may allow for connection to an external power source (e.g., such as an external direct-current (DC) power source) and/or an external load control device for controlling a lighting load located in the lighting fixture (e.g., such as an LED driver for controlling an LED light source). For example, the connector 250 may comprise two electrical terminals 252 configured to receive wires that may be connected to the power source to allow the control module to receive power for powering the electrical circuitry of the control module 200. In addition, the connector 250 may comprise two electrical terminals 254 that may receive wires that may be connected to the load control device via a wired communication link and/or a wired control link for controlling the lighting load.

Accordingly, the control module 200 may be configured to be coupled to external control devices that are configured with any of a variety of different wiring topologies. The topology may be a two-wire topology (e.g., which may allow for communication via the Digital Lighting Control Interface (DALI) protocol) or a four-wire topology (e.g., which may allow for communication via the 0-10V control protocol or the RS-485 digital communication protocol). The wiring topology may enable communication between the control module 200 and the control device via an analog communication protocol or a digital communication protocol. As described in more detail below, the control module 200 may be configured to detect (e.g., automatically detect) the wiring topology of a control device connected to the connector 250. For example, the control module 200 may be configured to determine whether it is coupled, via the connector 250, to a control device(s) that is configured to communicate according to a four-wire topology or a two-wire topology. For instance, the control module 200 may be configured to determine whether it is coupled, via the connector 250, to a control device(s) that is configured to communicate over the same terminals (e.g., the same two terminals) that the control module 200 also receives power (e.g., a two-wire topology), or communicate over different terminals (e.g., two different terminals) (e.g., a four-wire topology).

The wiring topology may be characterized by a combination of power and communication being provided over the same wires (e.g., power and communication both provided over a two-wire connection, such as with a DALI communication link, to the electrical terminals 252) or may be characterized as power and communication being provided over different wires (e.g., power provided over a two-wire connection, for example, to the electrical terminals 252, and communication provided over a different two-wire connection, for example, to the electrical terminals 254). Stated another way, the wiring topology may be characterized in terms of whether the power supply link can also be used for communication (e.g., as is the case with in two-wire topologies, where the wires connected to the electrical terminals 252 may provide both power and communication to the control module 200) or whether the power supply link is separate and distinct from the communication lines (e.g., as is the case in four-wire topologies where power is provided over two wires, such as those connected to the electrical terminals 252, and communication is provided over two different wires, such as those connected to the electrical terminals 254).

Figure 3A:
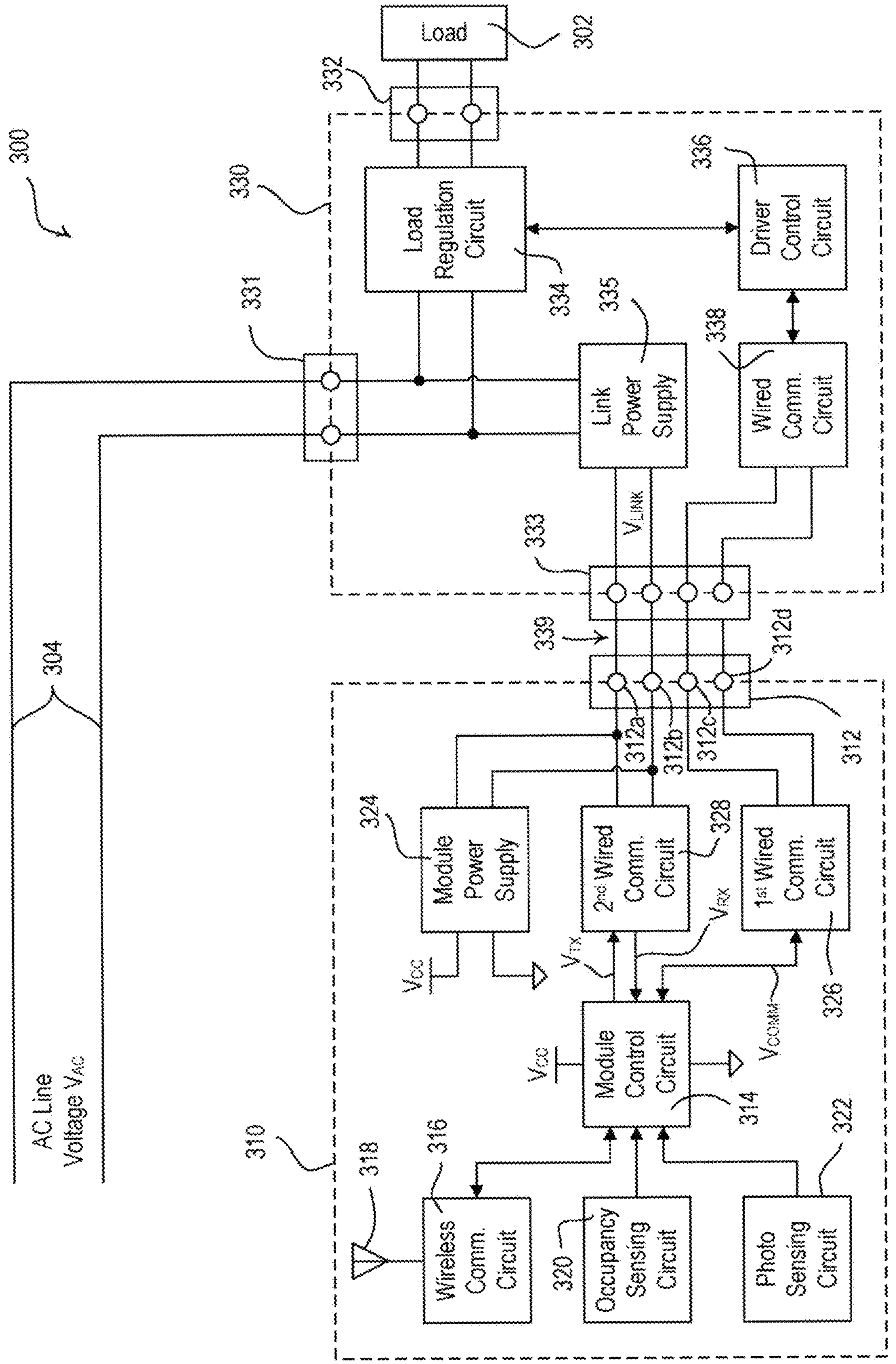
FIGS. 3A and 3B are block diagrams of an example load control system in first and second configurations, respectively.
Figure 3B:
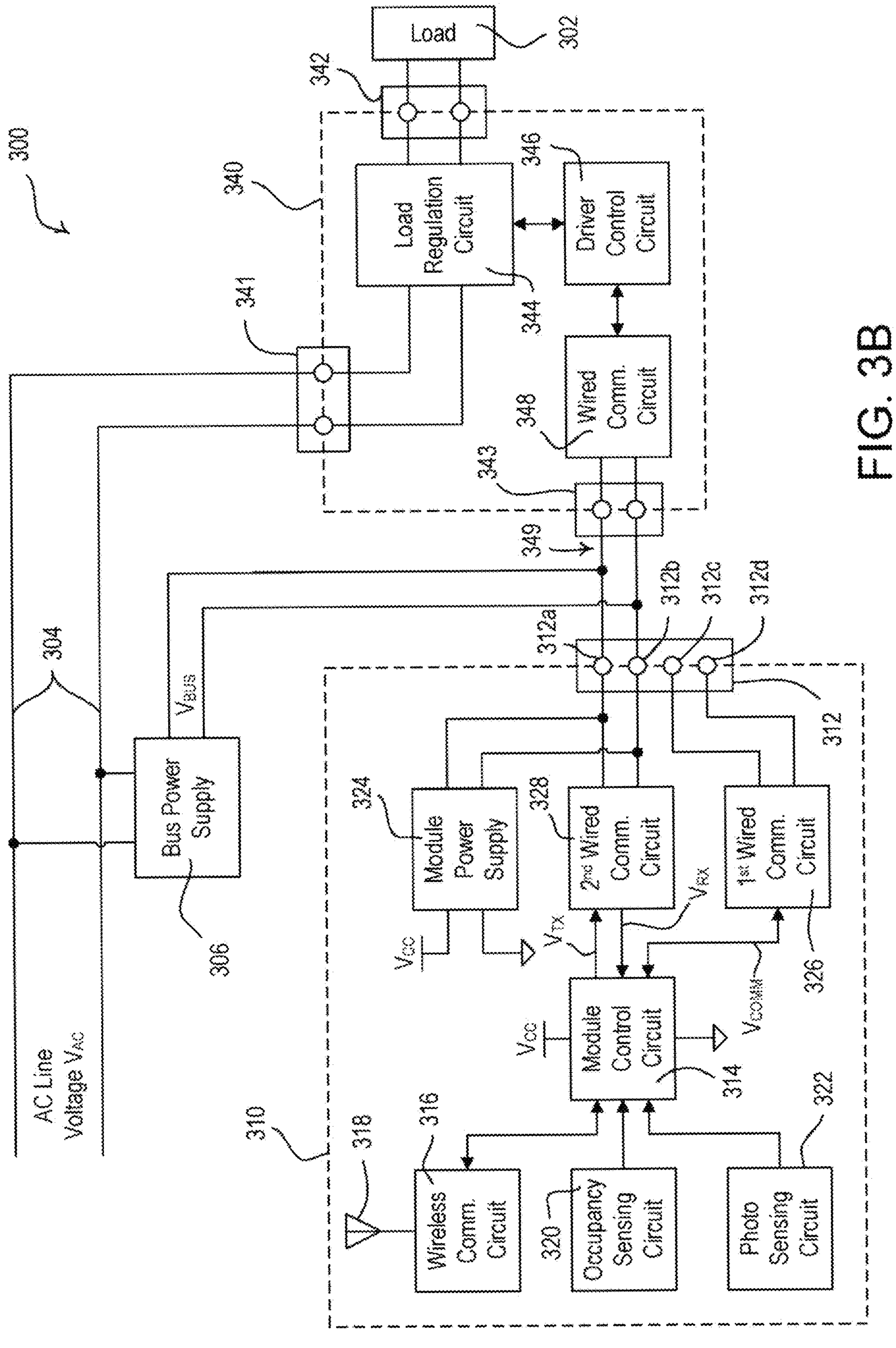

FIGS. 3A and 3B are block diagrams of an example load control system 300 in first and second configurations, respectively. The load control system 300 may comprise a control module 310 (e.g., a sensor device), which may be deployed as the control modules 120*a*-120*d* of the load control system 100 shown in FIG. 1 and/or the control module 200 shown in FIG. 2. In addition, the load control system 300 may comprise a first load regulation device, such as a first lighting control device 330, in the first configuration (e.g., as shown in FIG. 3A) and a second load regulation device, such as a second lighting control device 340, in the second configuration (e.g., as shown in FIG. 3B). The first configuration may be defined by the control module 310 being coupled to one or more control devices using a four-wire topology, while the second configuration may be defined by the control module 310 being coupled to one or more control devices using a two-wire topology.

The first and second lighting control devices 330, 340 may be LED drivers and may be examples of the lighting control devices of the lighting control devices of the lighting fixtures 110*a*-110*d* of the load control system 100 of FIG. 1. The first and second lighting control devices 330, 340 may be electrically coupled to an alternating-current (AC) power source (not shown) via power wires 304 for receiving an AC mains lines voltage $V_{AC}$ from the AC power source. The first and second lighting control devices 330, 340 may each be configured to control an amount of power delivered from the AC power source to an electrical load, such as a lighting load 302 (e.g., an LED light source). The lighting load 302 and the control module 310 may be configured to be installed in and/or onto a lighting fixture (e.g., one of the lighting fixtures 110*a*-110*d* shown in FIG. 1) along with the first lighting control device 370 in the first configuration and the second lighting control device 380 in the second configuration.

The control module 310 may comprise a control connector 312 (e.g., the connector 250 of the sensor module 200 shown in FIG. 2) configured to be electrically connected to the first lighting control device 330 in the first configuration and the second lighting control device 340 in the second configuration. For example, the control connector 312 of the control module 310 may comprise four electrical terminals (e.g., the electrical terminals 252, 254). The control module 310 may be configured to receive power via the control connector 312 for powering the electrical circuitry of the control module 310 (e.g., may receive power via electrical terminals 312*a*, 312*b*). The control module 310 may also be coupled to the first lighting control device 330 and/or the second lighting control device 340 via the control connector 312.

The control module 310 may comprise a module control circuit 314 for controlling the operation of the control module 310. For example, the module control circuit 314 may comprise one or more of a processor (e.g., a microprocessor), a microcontroller, a programmable logic device (PLD), a field programmable gate array (FPGA), an application specific integrated circuit (ASIC), or any suitable controller or processing device. The control module 310 may also include a memory (not shown). The memory may be communicatively coupled to the module control circuit 314 for the storage and/or retrieval of, for example, operational settings of the control module 310. In addition, the memory may be configured to store software for execution by the module control circuit 314 to operate the control module 310. The memory may be implemented as an external integrated circuit (IC) and/or as an internal circuit of the module control circuit 314.

The control module 310 may comprise a wireless communication circuit 316 configured to communicate with control devices of the load control system via wireless signals, such as RF signals (e.g., the RF signals 104, 105 shown in FIG. 1). The wireless communication circuit 316 may include for example, one or more radio-frequency (RF) transceivers coupled to an antenna 318 (e.g., the antenna 280) for transmitting and/or receiving the RF signals. The wireless communication circuit 316 may also include one or more of an RF transmitter for transmitting RF signals and/or an RF receiver for receiving RF signals. While shown separately from the module control circuit 314 in FIGS. 3A and 3B, the wireless communication circuit 316 may also be implemented as an internal circuit of the module control circuit 314.

The wireless communication circuit 316 may be configured to transmit and/or receive messages (e.g., digital messages) via the RF signals. For example, the wireless communication circuit 316 may be configured to transmit and/or receive messages on a first wireless communication link using a first wireless protocol (e.g., via the RF signals 104 on the wireless network communication link using the wireless network communication protocol), and on a second wireless communication link using a second wireless protocol (e.g., via the RF signals 105 on the short-range wireless communication link using the short-range wireless communication protocol). For example, the wireless communication circuit 316 may comprise a single RF transceiver configured to communicate on the wireless network communication link and the short-range wireless communication link, or multiple (e.g., two) RF transceivers, such as a first RF transceiver for communicating on the wireless network communication link and a second RF transceiver for communicating on the short-range wireless communication link. The messages received by the module control circuit 315 via the RF signals may include configuration data for configuring the control module 310 and/or control data (e.g., commands) for controlling the lighting load 302. The configuration data and/or control data may include identification information (e.g., such as a unique identifier) associated with the control module 310.

The control module 300 may comprise an occupancy sensing circuit 320 configured to sense (e.g., detect) an occupancy and/or vacancy condition in the vicinity of the lighting fixture in which the control module 300 is installed (e.g., in the room 102). The occupancy sensing circuit 320 may comprise a detector (e.g., the detector 270) for detecting an occupancy and/or vacancy condition in the space. For example, the occupancy sensing circuit 320 may comprise a passive infrared (PIR) sensing circuit, where the detector is a pyroelectric detector. In addition, the detector may comprise one or more of an ultrasonic detector, and/or a microwave detector. For example, a pyroelectric detector may be configured to receive infrared energy from an occupant in the space below the control module 200 (e.g., below the lighting fixture) through a lens (e.g., the lens 222 shown in FIG. 2) to thus sense the occupancy condition in the space. The module control circuit 314 may be configured to determine a vacancy condition in the space after a timeout period expires since the last occupancy condition was detected. The module control circuit 314 may be configured to control the first and/or second lighting control device 330, 340 to turn the lighting load 304 on and off and to adjust the intensity level of the lighting load 304 in response to the occupancy sensing circuit 320 detecting occupancy and/or vacancy conditions.

The control module 300 may comprise a photo-sensing circuit 322 configured to measure a light level (e.g., an ambient light level and/or a daylight level) in the vicinity of the lighting fixture in which the control module 300 is installed (e.g., in the room 102). The photo-sensing circuit 322 may comprise a photosensor (e.g., the photosensor 272) for measuring the light level in the space. For example, the photosensor may be configured to receive light from the space below the control module 200 (e.g., below the lighting fixture) through the lens (e.g., the lens 222) to thus measure the light level in the space. The module control circuit 314 may be configured to control the first and/or second lighting control device 330, 340 to turn the lighting load 304 on and off and to adjust the intensity level of the lighting load 304 in response to the light level measured by the photo-sensing circuit 322.

The control module 310 may one or more circuits coupled to the control connector 312 for receiving power and/or controlling the first and/or second lighting control devices 330, 340 (e.g., depending on whether the load control system 300 is in the first configuration or the second configuration, as will be described in greater detail below). The control module 310 may comprise a module power supply 324 (e.g., an internal power supply) configured to receive power via the electrical terminals 312*a*, 312*b* of the control connector 312 and generate a direct-current (DC) module supply voltage $V_{CC}$ (e.g., approximately 2.5 V, 3.3 V, or 5 V) for powering the module control circuit 314, the wireless communication circuit 316, the occupancy sensing circuit 320, the photo-sensing circuit 322, and/or other electrical circuitry of the control module.

The control module 310 may comprise a first wired communication circuit 326, which may be coupled to two electrical terminals 312*c*, 312*d* of the control connector 312 and may be used to communicate with the first lighting control device 330 in the first configuration. The control module circuit 314 may be configured to transmit and/or receive one or more communication signals $V_{COMM}$ to and/or from the first wired communication circuit 326 over a communication line. The communication line may be a bidirectional communication line. For example, the control module circuit 314 may be configured to communicate using the first wired communication circuit 326 when the control module 310 is coupled to the first lighting control device 330 in a four-wire topology, e.g., via a four-wire control link 339. For example, the control module circuit 314 may be configured to communicate with the first lighting control device 330 via the first wired communication circuit 326 using a wired analog control protocol (e.g., the 0-10V control protocol) or a wired digital communication protocol (e.g., the RS-485 digital communication protocol).

The control module 310 may comprise a second wired communication circuit 328 which may be coupled to the electrical terminals 312*a*, 312*b* of the control connector 312 and may be used to communicate with the second lighting control device 340 in the second configuration. For example, the second wired communication circuit 328 may be configured to communicate using the second wired communication circuit 328 when the control module 310 is coupled to the second lighting control device 340 in a two-wire topology, e.g., via a two-wire control link 349. For example, the control module circuit 314 may be configured to communicate with the first lighting control device 330 via the first wired communication circuit 326 using a wired analog control protocol (e.g., the Digital Addressable Lighting Interface (DALI) protocol).

For example, the module control circuit 314 may be configured to provide a transmit signal $V_{TX}$ to the second wired communication circuit 328, and the second wired communication circuit 328 may be configured to control the two-wire control link 349 according to the transmit signal $V_{TX}$. For example, the second wired communication circuit 328 may be configured to control the two-wire control link 349 to a high state or a low state (e.g., by driving the voltage across the electrical terminals 312*a*, 312*b* high or low, respectively) based on the transmit signal $V_{TX}$. In some examples, the second wired communication circuit 328 may be configured to short the transmit signal $V_{TX}$ to drive the two-wire control link 349 low. For example, the two-wire control link 349 may be an idle-high link, e.g., a control link that is in the high state when not being controlled (e.g., shorted low) by the module control circuit 314. Further, the second wired communication circuit 328 may be configured to provide a receive signal $V_{RX}$ that indicates the state of the two-wire control link 349 to the control module circuit 314. In some examples, the receive signal $V_{RX}$ may be in a high or low state based on the state of the two-wire control link 349. The second wired communication circuit 328 may be configured to receive the transmit signal $V_{TX}$ and control the state of the two-wire control link 349 based on the transmit signal $V_{TX}$, while at the same time provide the receive signal $V_{RX}$ that indicates the state of the two-wire control link 349 to the module control circuit 314.

When the load control system 300 is in the first configuration as shown in FIG. 3A, the control module 310 may be coupled to the first lighting control device 330 via the four-wire control link 339 (e.g., in the four-wire topology). The first lighting control device 330 may comprise a power connector 331 configured to be electrically coupled to the AC power source via the power wires 304 for receiving the AC mains lines voltage $V_{AC}$ and a load connector 332 configured to be electrically coupled to the lighting load 302. The first lighting control device 330 may also comprise a control connector 333 that may be configured to be electrically coupled to the control module 310 via the four-wire control link 339. For example, the control connector 333 of the first lighting control device 330 may comprise four electrical terminals as shown in FIG. 3A.

The first lighting control device 330 may comprise a load regulation circuit 334 (e.g., an LED drive circuit) that may be coupled between the power connector 331 and the load connector 332 and may be configured to control the amount of power delivered to the lighting load 302. The first lighting control device 330 may comprise a link power supply 335 coupled to receive the AC mains line voltage $V_{AC}$ via the power connector 331 and generate a link supply voltage $V_{LINK}$ for powering the control module 310 via the control connector 333. The module power supply 324 of the control module 310 may receive the link supply voltage $V_{LINK}$ via the electrical terminals 312*a*, 312*b* of the control connector 312. The link power supply 335 may be characterized by an internal power limit and/or current limit. As noted above, the second wired communication circuit 328 may be configured to control the two-wire control link to a high state or a low state (e.g., by driving the voltage across the electrical terminals 312*a*, 312*b* high or low, respectively) based on the transmit signal $V_{TX}$. If the voltage across the electrical terminals 312*a*, 312*b* causes the link power supply 335 to exceed its internal power limit and/or current limit, the link power supply 335 may trip, which may cause the magnitude of the receive signal $V_{RX}$ to drop to approximately zero volts and thus cause the control module 310 to lose power The first lighting control device 330 may comprise a driver control circuit 336 configured to control the load regulation circuit 334 to adjust the amount of power delivered to the lighting load 302 to adjust an intensity level of the lighting load. The first lighting control device 330 may further comprise a wired communication circuit 338 configured to be coupled to the control module 310 via the control connector 333 (e.g., the four-wire control link 339). The wired communication circuit 338 of the first lighting control device 330 may be coupled to the first wired communication circuit 326 of the control module 310 via the electrical terminals 312*c*, 312*d* of the control connector 312.

The first wired communication circuit 326 of the control module 310 may be configured to communicate with the wired communication circuit 338 of the first lighting control device 330 via the four-wire control link 339 when the control module 310 is coupled to the first lighting control device 330 in the four-wire topology. For example, the first wired communication circuit 326 may be configured to communicate via the electrical terminals 312*c*, 312*d* of the control connector 312. For instance, the first wired communication circuit 326 may be configured to generate, for example, an analog control signal, such as a 0-10V control signal, at the electrical terminals 312*c*, 312*d* of the control connector 312. For example, the first wired communication circuit 326 may comprise a current sink circuit configured to draw current from the wired communication circuit 338 of the first lighting control device 330 to generate the 0-10V control signal at the electrical terminals 312*c*, 312*d* of the control connector 312. The driver control circuit 336 of the first lighting control device 330 may be configured to adjust the intensity level of the lighting load 304 in response to a magnitude of the analog control signal received by the wired communication circuit 338.

Alternatively or additionally, the first wired communication circuit 326 may be configured to transmit messages (e.g., digital messages) to the wired communication circuit 338 of the first lighting control device 330 according to a digital communication protocol at the electrical terminals 312*c*, 312*d* of the control connector 312. For example, the first wired communication circuit 326 of the control module 310 and the wired communication circuit 338 of the first lighting control device 330 may comprise RS-485 communication circuits. The driver control circuit 336 of the first lighting control device 330 may be configured to adjust the intensity level of the lighting load 304 in response to control data (e.g., commands) included in the messages received by the wired communication circuit 338. When the control module 310 is wired to the first lighting control device 330 in the first configuration (e.g., in the four-wire topology), the module control circuit 314 of the control module 310 may be configured to disable the second wired communication circuit 328. For example, when operating in the first configuration, the control module 310 may be configured to disable the second wired communication circuit 328 but still receive power at the electrical terminals 312*a*, 312*b*.

When the load control system 300 is in the second configuration as shown in FIG. 3B, the control module 310 may be coupled to the second lighting control device 340 via the two-wire control link 349 (e.g., in the two-wire topology). The second lighting control device 340 may comprise a power connector 341 configured to be electrically coupled to the AC power source via the power wires 304 for receiving the AC mains lines voltage $V_{AC}$ and a load connector 342 configured to be electrically coupled to the lighting load 302. The second lighting control device 340 may also comprise a control connector 343 that may be configured to be electrically coupled to the control module 310 via the two-wire control link 349. For example, the control connector 343 of the first lighting control device 340 may comprise two electrical terminals as shown in FIG. 3B. As described in more detail herein, the two-wire control link 349 may be used to provide power to the control module 310 and allow for communication between the control module 310 and the lighting control device 340.

The second lighting control device 340 may comprise a load regulation circuit 344 (e.g., an LED drive circuit) that may be coupled between the power connector 341 and the load connector 342 and may be configured to control the amount of power delivered to the lighting load 302. The second lighting control device 340 may comprise a driver control circuit 346 configured to control the load regulation circuit 344 to adjust the amount of power delivered to the lighting load 302 to adjust the intensity level of the lighting load.

The second lighting control device 340 may further comprise a wired communication circuit 348 configured to be coupled to the control module 310 via the control connector 343 (e.g., the two-wire control link 339). The wired communication circuit 348 of the first lighting control device 340 may be coupled to the second wired communication circuit 328 of the control module 310 via the electrical terminals 312*a*, 312*b* of the control connector 312. In some examples, the second wired communication circuit 328 of the control module 310 may be configured to transmit messages (e.g., digital messages) to the wired communication circuit 348 of the first lighting control device 340 according to a digital communication protocol, e.g., such as the DALI protocol. The driver control circuit 346 of the second lighting control device 340 may be configured to adjust the intensity level of the lighting load 304 in response to control data (e.g., commands) included in the messages received by the wired communication circuit 348.

In the second configuration, the control module 310 may be configured to receive power from the two-wire control link 349 via the electrical terminals 312*a*, 312*b* of the control connector 312. For example, the two-wire control link 349 may be a dual-purpose power and communication link. As such, the electrical terminals 312*c*, 312*d* of the control connector 312 may remain unconnected. Further, when in the second configuration, the control module 310 may be configured to disable the first wired communication circuit 326 (e.g., because the second wired communication circuit 328 may handle the communication with the wired communication circuit 348 of the second lighting control device 340). Further, in some examples, the two-wire control link 349 may be configured to be in an idle-high link such that, when messages are not being communicated, the wo-wire control link 349 may default to an idle-high state (e.g., so that the devices on the link can receive power (e.g., charge)).

In some examples, the second lighting control device 340 may not comprise a module power supply for powering the control module 310. For example, the lighting control system 300 may comprise a bus power supply 306 in the second configuration. The bus power supply 306 may be configured to receive the AC mains line voltage $V_{AC}$ from the AC power source and generate a bus voltage $V_{BUS}$, which may be electrically coupled to the two-wire control link 349 (e.g., the electrical terminals 312*a*, 312*b* of the control connector 312) to provide for communications on the two-wire control link 349 as well as to power the control module 310. The bus power supply 306 may be external to the lighting fixture on which the control module 310 is installed and/or may be included in the lighting fixture in which the control module 310 is installed. The module power supply 324 of the control module 310 may receive the bus voltage $V_{BUS}$ via the electrical terminals 312*a*, 312*b* of the control connector 312 (e.g., when the second wired communication circuit 328 of the control module 310 and/or the wired communication circuit 348 of the second lighting control device 340 are not transmitting messages on the two-wire control link 349). Additionally and/or alternatively, the bus power supply 306 may be included in the second lighting control device 340.

The module control circuit 314 may be configured to determine whether the control module 310 is coupled to a control device in the first configuration or the second configuration (e.g., coupled to the first lighting control device 330 or the second lighting control device 340). That is, the module control circuit 314 may be configured to detect (e.g., automatically detect) the wiring topology of the connection between the control device and control module via the connector 312. For example, the module control circuit 314 may determine whether the control module 310 should communicate with the control device via the electrical terminals 312*c*, 312*d* in the four-wire topology (e.g., where power is provided via the electrical terminals 312*a*, 312*b* and communication is provided via the electrical terminals 312*c*, 312*d*) or via the electrical terminals 312*a*, 312*b* in the two-wire topology (e.g., where power and communication are both provided via the electrical terminals 312*a*, 312*b*). Accordingly, the module control circuit 314 may determine whether the control module should communicate with the control device using the first wired communication circuit 326 (e.g., via the four-wire topology) or the second wired communication circuit 328 (e.g., via the two-wire topology). When the module control circuit 314 determines that the control module 310 is coupled to a control device in the first configuration, the module control circuit 314 may disable the second wired communication circuit 328. When the module control circuit 314 determines that the control module 310 is coupled to a control device in the second configuration, the module control circuit 314 may disable the first wired communication circuit 326.

As noted above, the control module 310 may be configured to be coupled to external control devices that are configured with any of a variety of different wiring topologies. The wiring topology may be a two-wire topology or a four-wire topology. The wiring topology may enable communication between the control module 310 and the lighting control device via an analog communication protocol or a digital communication protocol. The wiring topology may be characterized by a combination of power and communication being provided over the same wires (e.g., power and communication both provided over a two-wire connection, such as with a DALI communication link, to the electrical terminals 312*a*, 312*b*) or may be characterized as power and communication being provided over different wires (e.g., power provided over a two-wire connection, for example, to the electrical terminals 312*a*, 312*b*, and communication provided over a different two-wire connection, for example, to the electrical terminals 312*c*, 312*d*). Stated another way, the wiring topology may be characterized in terms of whether the power supply link can also be used for communication (e.g., as is the case with the two-wire topology, where wires connected to the electrical terminals 312*a*, 312*b* may provide both power and communication to the control device 310) or whether the power supply link is separate and distinct from the communication lines (e.g., as is the case in four-wire topology where power is provided over two wires, such as those connected to the electrical terminals 312*a*, 312*b*, and communication is provided over two different wires, such as those connected to the electrical terminals 312*c*, 312*d*).

The control module 310 may be configured to attempt to generate a test signal across the electrical terminals 312*a*, 312*b* (e.g., at the two-wire control link 349) at the connector 312, and determine, based on a test response at (e.g., measured across) the electrical terminals 312*a*, 312*b* at the connector 312, whether the control module 310 is coupled to a control device in the first configuration or the second configuration (e.g., via the two-wire topology or the four-wire topology). For example, the control module 310 may be configured to determine whether the control module 310 is coupled to a control device in the first configuration or the second configuration based on the receive signal $V_{RX}$. For instance, as noted above, the module control circuit 314 may be configured to provide the transmit signal $V_{TX}$ to the second wired communication circuit 328, and the second wired communication circuit 328 may be configured to control the magnitude of the voltage across the electrical terminals 312*a*, 312*b* according to the transmit signal $V_{TX}$. The module control circuit 314 may be configured to control the transmit signal $V_{TX}$ to generate the test signal across the electrical terminals 312*a*, 312*b*. Further, the second wired communication circuit 328 may be configured to provide the receive signal $V_{RX}$ that indicates the magnitude of the voltage across the electrical terminals 312*a*, 312*b* to the control module circuit 314. As noted herein, the two-wire control link 349 may be in a high state or a low state, which for example, may be based on the magnitude of the voltage across the electrical terminals 312*a*, 312*b* (e.g., when in the second configuration). The module control circuit 314 may be configured to receive a test response via the receive signal $V_{RX}$ from the second wired communication circuit 328. In some examples, the control module 310 may be configured to determine whether the control module 310 is coupled to a control device in the first configuration or the second configuration based on the receive signal $V_{RX}$.

Figure 4A:
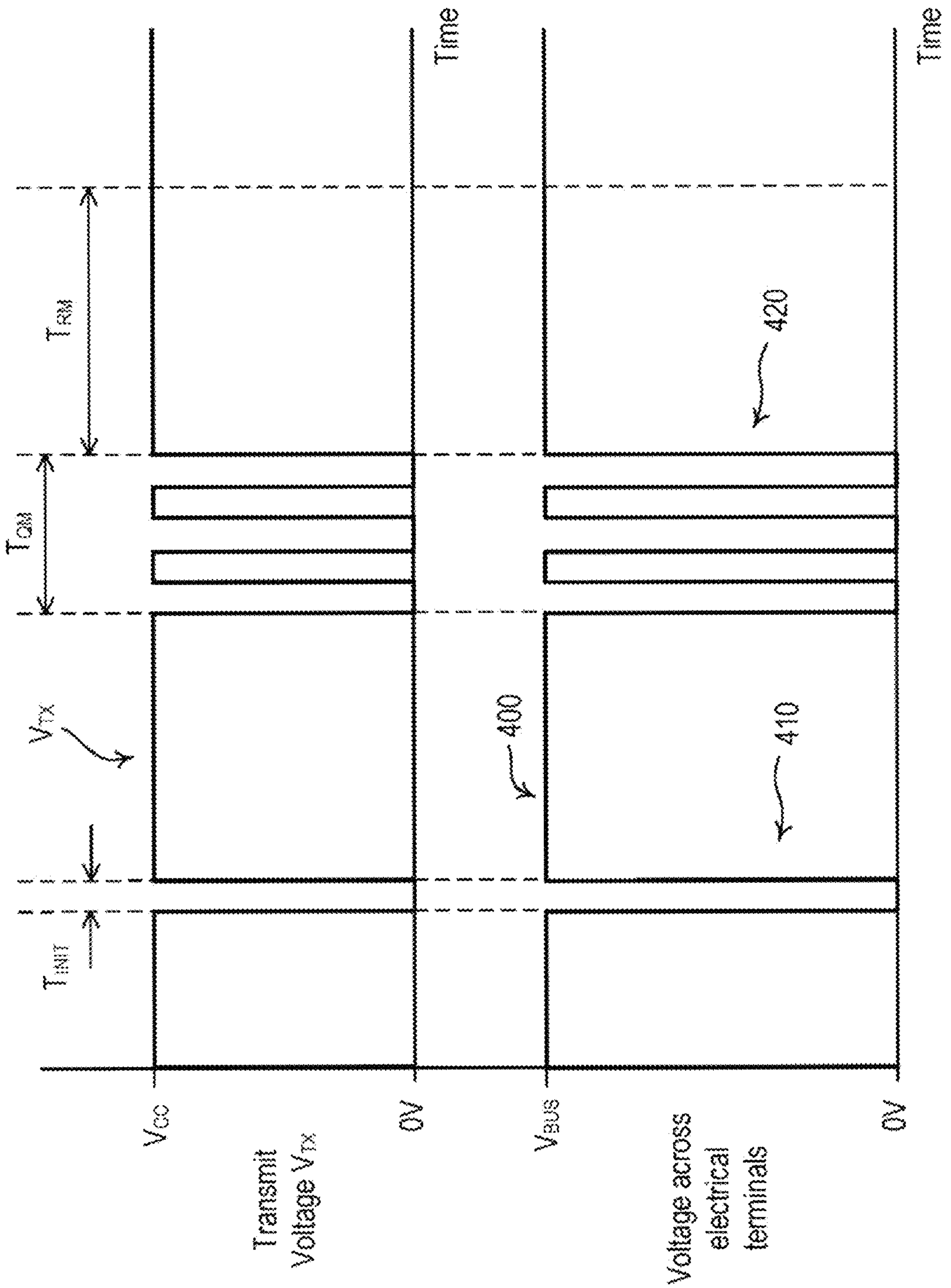
FIGS. 4A-4I are example waveforms of the transmit and receive signals generated and received by the control module.

FIG. 4A is an example waveform of a transmit signal $V_{TX}$ and a test signal 400 that may be generated during a configuration procedure (e.g., an automatic configuration procedure) of the control module 310. During the configuration procedure, the module control circuit 314 may generate the test signal 400 (e.g., a transmit signal $V_{TX}$) to determine whether the control module 310 is coupled to a control device (e.g., the control device 330 or the control device 340) in the first configuration or the second configuration (e.g., and whether the control module can communicate with the control device using a four-wire or two-wire topology). For example, the module control circuit 314 may control the transmit signal $V_{TX}$ to cause the second wired communication circuit 328 to generate the test signal 400 across via the electrical terminals 312*a*, 312*b*. The module control circuit 314 may determine whether the control module 310 is coupled to a control device in the first configuration or the second configuration based on a test response. The test response may be indicated by the magnitude of the receive signal $V_{RX}$, a loss of power at the control module 310, a reception of a message via the receive signal $V_{RX}$, and/or a collision of messages detected by the module control circuit 314.

The module control circuit 314 may provide the transmit signal $V_{TX}$ (e.g., the test signal 400 and/or a portion of the test signal 400) to the second wired communication circuit 328, and the second wired communication circuit 328 may control the magnitude of the voltage across the electrical terminals 312*a*, 312*b* based on the magnitude of the transmit signal $V_{TX}$. The module control circuit 314 may receive the receive signal $V_{RX}$ from the second wired communication circuit 328, and the magnitude of the receive signal $V_{RX}$ may indicate the magnitude of the voltage across the electrical terminals 312*a*, 312*b*. The second wired communication circuit 328 may be coupled to the electrical terminals 312*a* 312*b* at which the control module 310 also receives power.

To generate the test signal 400 across the electrical terminals 312*a*, 312*b*, the module control circuit 314 may adjust the magnitude of the transmit signal $V_{TX}$ to vary between a high voltage value (e.g., approximately the module supply voltage $V_{CC}$) and a low voltage value (e.g., approximately circuit common or zero volts). For example, the second wired communication circuit 328 may generate the test signal 400, such that the test signal 400 is a scaled version of the transmit signal $V_{TX}$ (e.g., as shown in FIG. 4A). As a result, the magnitude of the test signal 400 may vary between a high voltage value (e.g., approximately the bus supply voltage $V_{BUS}$) and a low voltage value (e.g., approximately zero volts). The module control circuit 314 may generate the test signal 400, such that the test signal 400 may include an initial pulse 410 during an initial pulse period $T_{INIT}$ and one or more query messages 420 during one or more query message periods $T_{QM}$. The module control circuit 314 may monitor the receive signal $V_{RX}$ during a one or more response message periods $T_{RM}$ (e.g., where there may be a response message period associated with each of the query message periods).

The generation of the test signal 400 (e.g., between the electrical terminals 312*a*, 312*b*) can lead to a variety of different test responses based on the type of control device coupled to the terminals (e.g., between the electrical terminals 312*a*, 312*b*). The module control circuit 314 may be configured to determine whether the control module 310 is coupled to a control device in the first configuration or the second configuration (e.g., and whether the control module can communicate with the control device using a four-wire or two-wire topology) based on the test response.

Figure 4B:
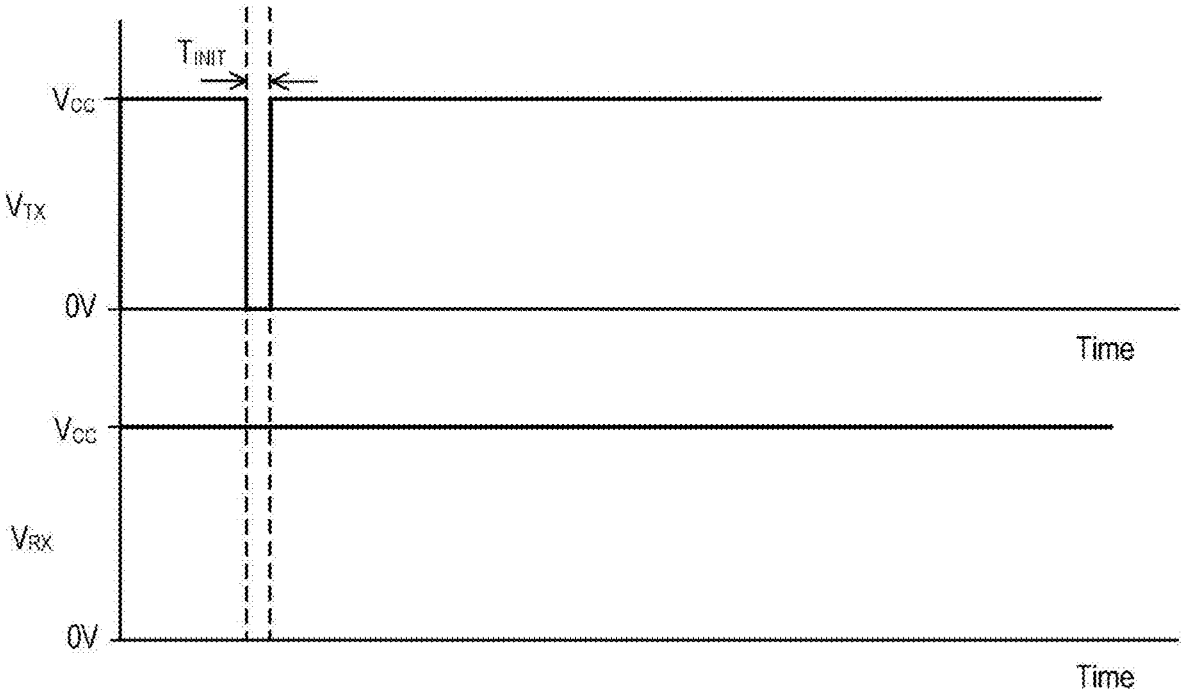
Figure 4C:
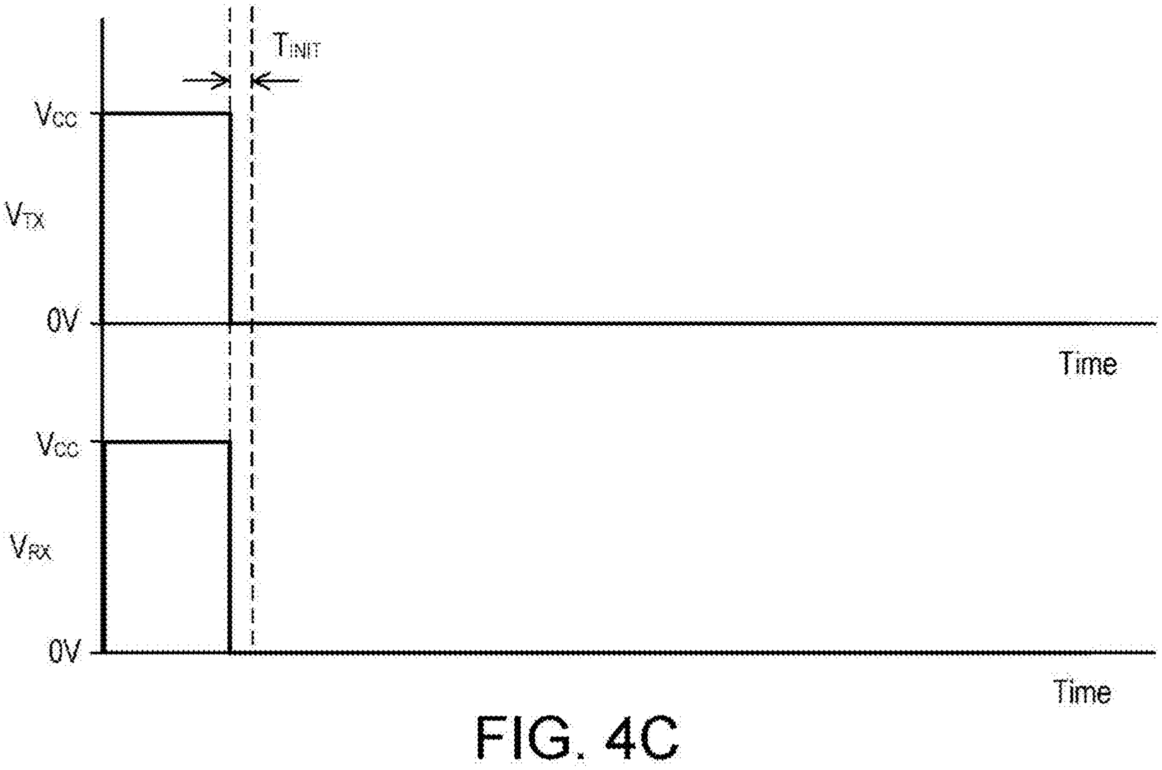
Figure 4D:
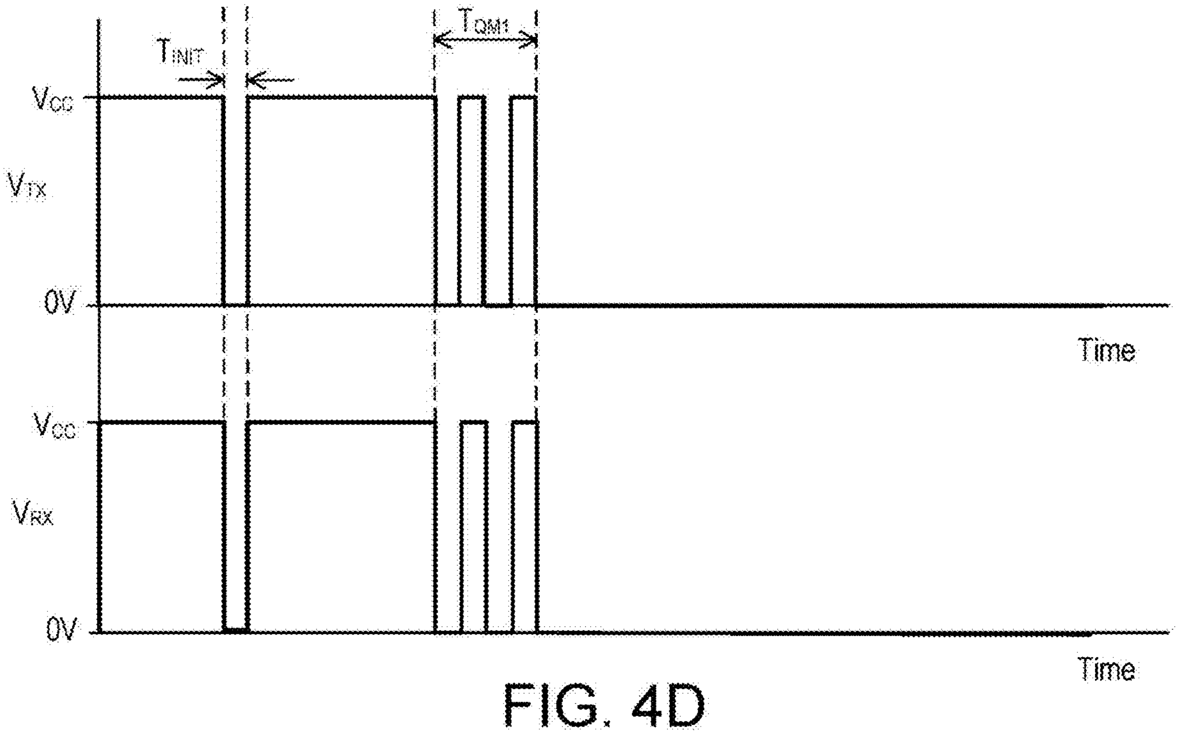
Figure 4E:
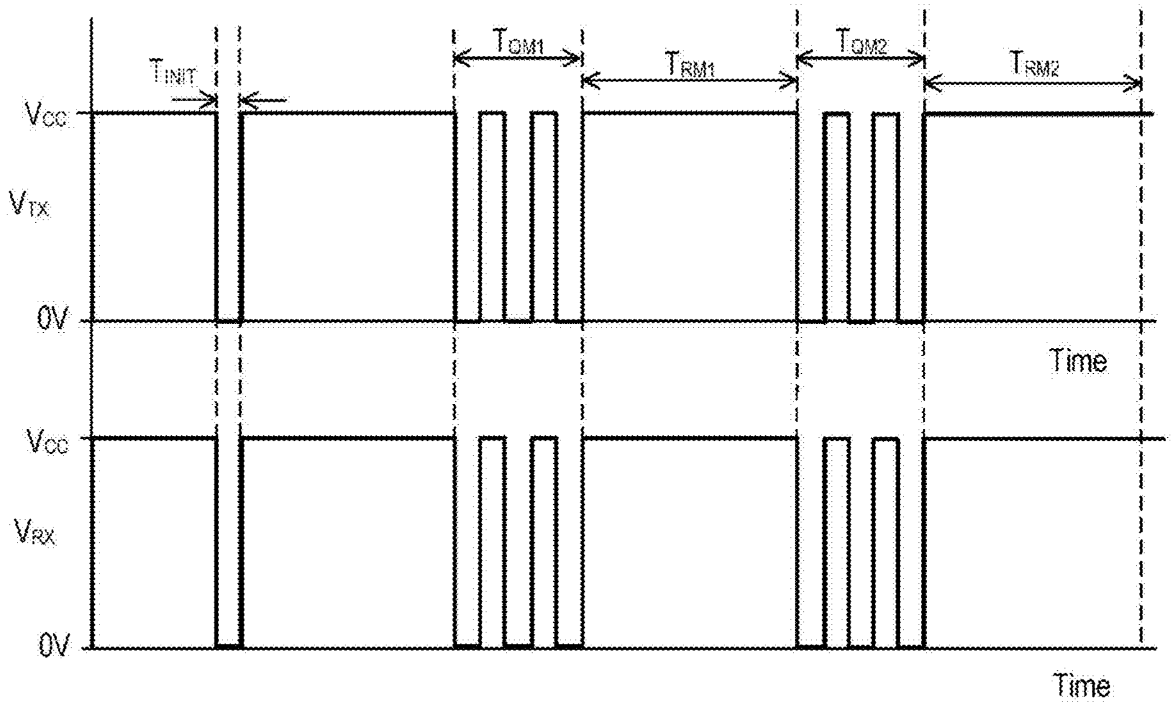
Figure 4F:
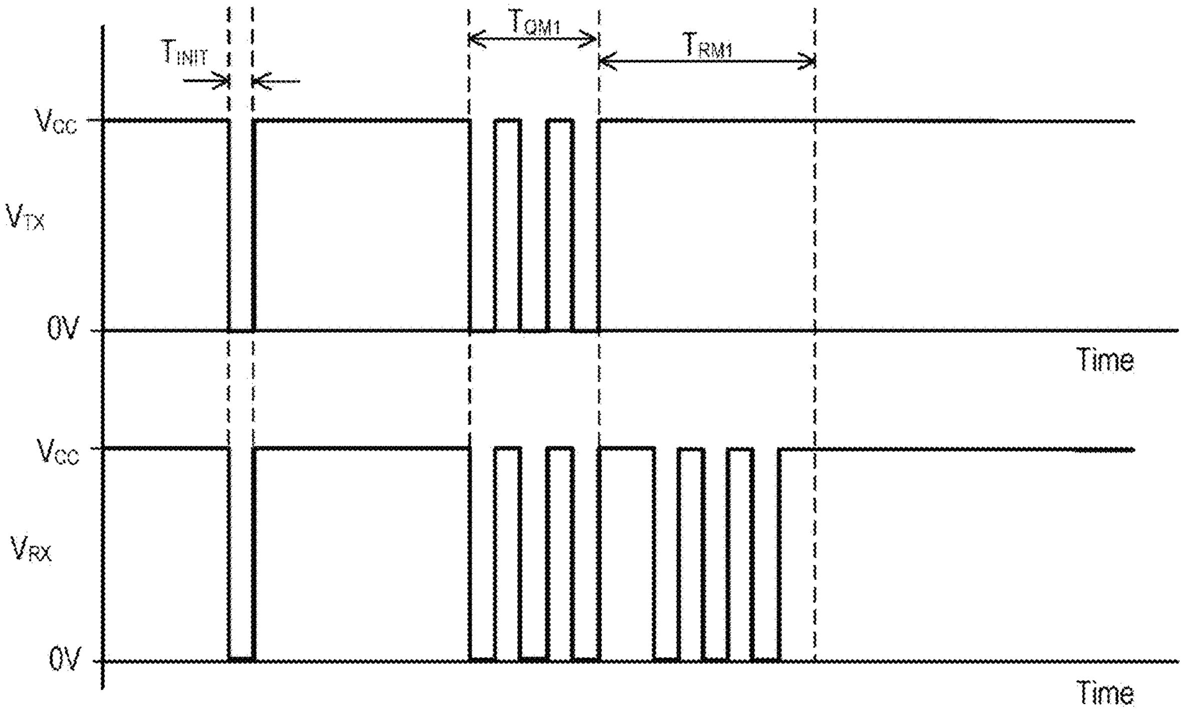
Figure 4G:
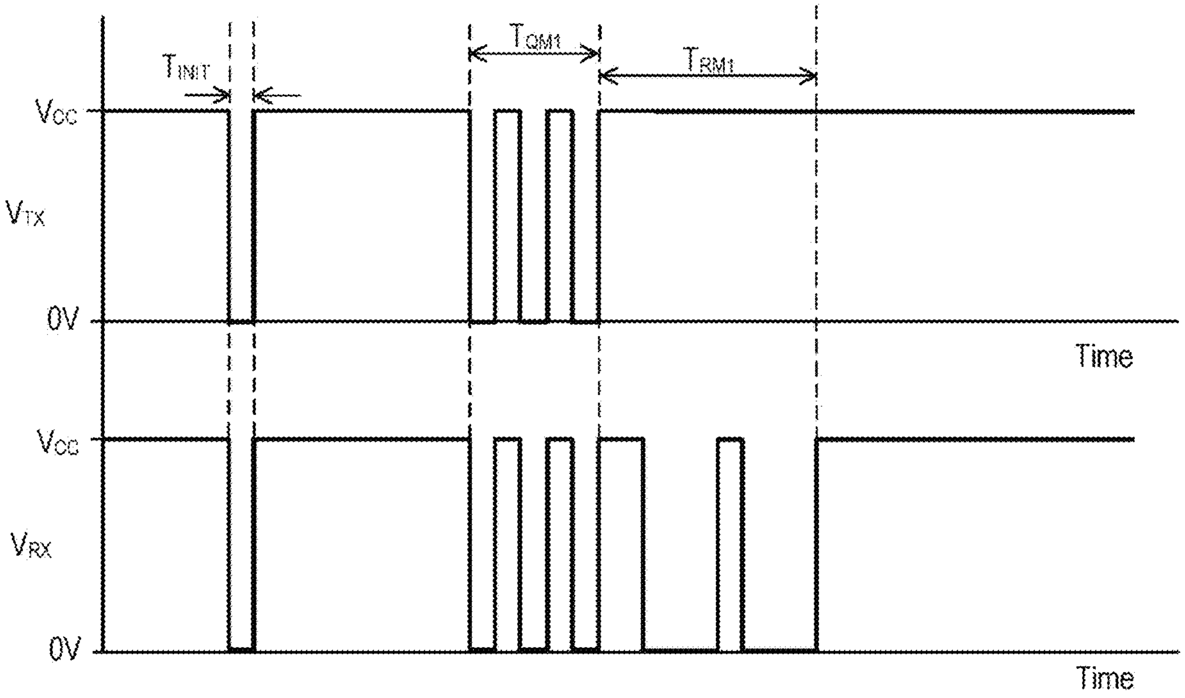
Figure 4H:
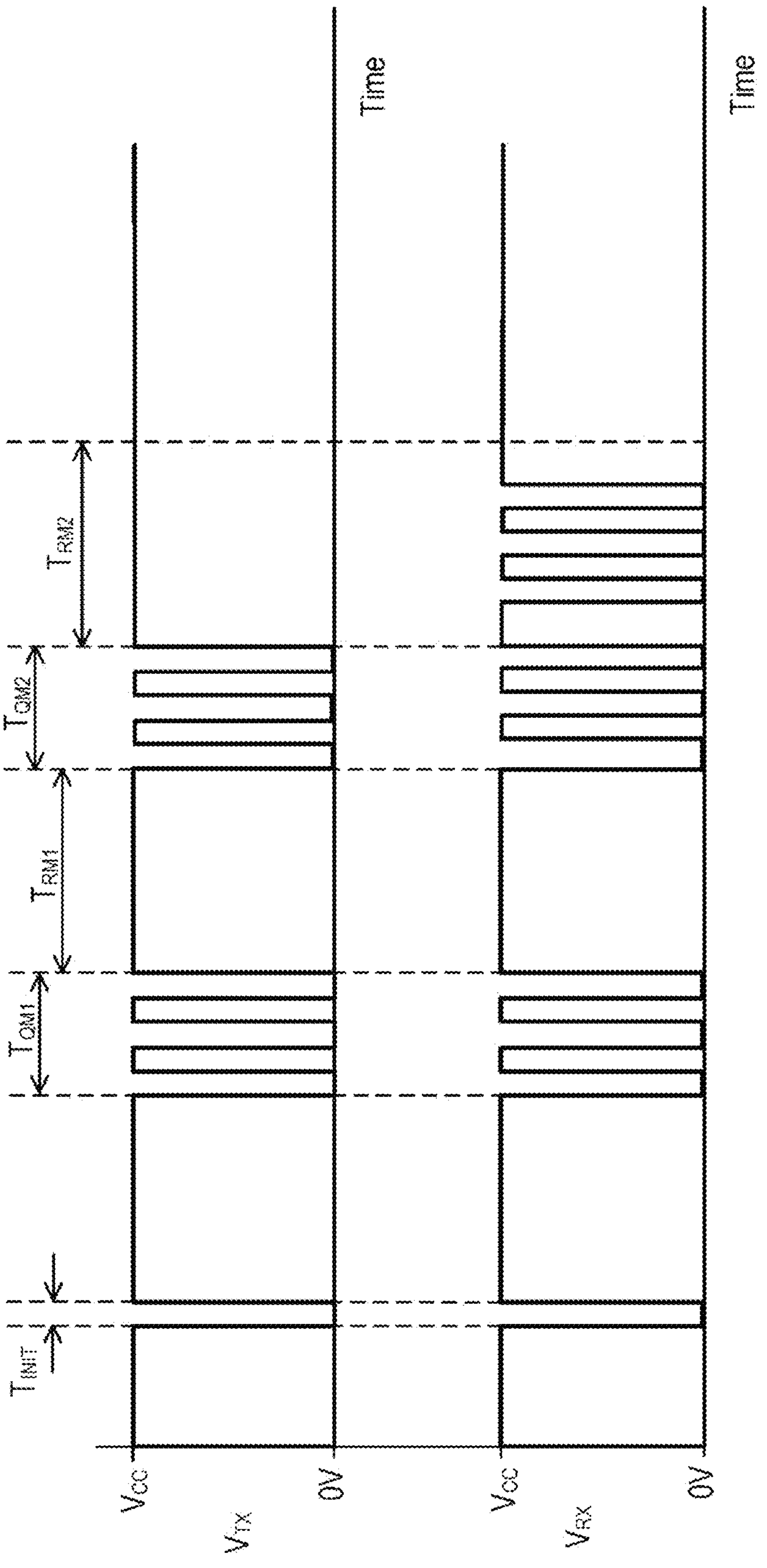
Figure 4I:
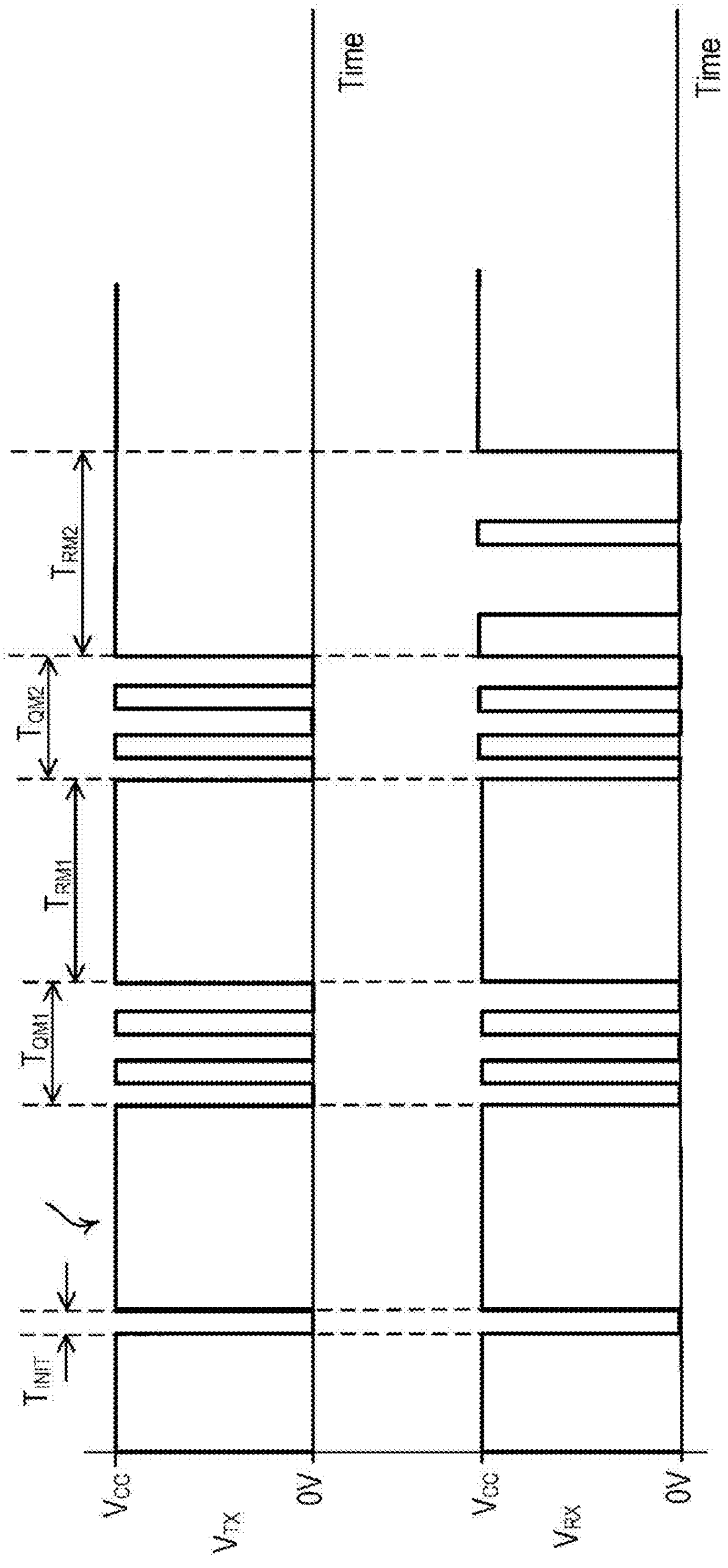

For example, FIGS. 4B-4I are example waveforms of the transmit signal $V_{TX}$ generated by and the receive signal $V_{RX}$ received by the module control circuit 314 during a configuration procedure (e.g., an automatic configuration procedure) of the control module 310. For example, the module control circuit 314 may be configured to determine that it is coupled in the four-wire topology (e.g., in the first configuration as shown in FIG. 3A) in response to detecting that the magnitude of the receive signal $V_{RX}$ does not change during the initial pulse period $T_{INIT}$ of the test signal 400 (e.g., as shown in FIG. 4B), determining that the control module 310 lost power while executing the configuration procedure (e.g., as shown in FIGS. 4C-4D), and/or not receiving a test response to one or more transmitted query messages (e.g., as shown in FIG. 4E). In addition, the module control circuit 314 may be configured to determine that it is coupled in the two-wire topology (e.g., in the second configuration as shown in FIG. 3B) in response to detecting at least one test responses to one or more transmitted query messages (e.g., as shown in FIGS. 4F and 4H) and/or determining that there has been a collision of test responses after the transmission of one or more query messages (e.g., as shown in FIGS. 4G and 4I).

For example, when wired in the two-wire topology, a control device coupled across the electrical terminals 312*a*, 312*b* may be configured to communicate with the control module 310 via the electrical terminals 312*a*, 312*b*. In such instances, the module control circuit 314 may generate the test signal 400, and in response, may receive the receive signal $V_{RX}$, which may indicate a message transmitted by the control device. For example, the module control circuit 314 may be configured to cause the second wired communication circuit 328 to transmit a query message 420 via the electrical terminals 312*a*, 312*b* and receive one or more test responses (e.g., response messages) from a control device coupled across the electrical terminals 312*a*, 312*b* using the receive signal $V_{RX}$ assuming that the control device is configured to communicate with the control module 310 when wired in the two-wire topology. However, if the control device coupled across the electrical terminals 312*a*, 312*b* is configured to communicate with the control module 310 using a four-wire topology, the module control circuit 314 may not receive one or more test responses from the control device coupled across the electrical terminals 312*a*, 312*b*. For instance, in scenarios where the control module 310 is coupled to a control device that is configured to communicate with the control module when wired in the four-wire topology, the module control circuit 314 may determine that the control device is configured to communicate with the control module in the four-wire topology based on, for example, magnitude of the receive signal $V_{RX}$ and/or a loss of power at the control module 310 in response to the module control circuit 314 generating the test signal 400.

As described in more detail below, FIGS. 4B-4E may illustrate an example of the transmit signal $V_{TX}$ and the receive signal $V_{RX}$ when the control module 310 is coupled to the first lighting control device 330 in the first configuration, such as via the four-wire control link 339, and may be configured to communicate with the first lighting control device 330 when wired in the four-wire topology. FIGS. 4F-4I may be indicative of the transmit signal $V_{TX}$ and the receive signal $V_{RX}$ when the control module 310 is coupled to the second lighting control device 430 in the second configuration, such as via the two-wire control link 349, and may be configured to communicate with the second lighting control device 340 when wired in the two-wire topology. Further, in some examples, the control module 310 may determine that the electrical terminals 312*c*, 312*d* are unused and/or may disable the first wired communication circuit 326 (e.g., when wired in the two-wire topology).

FIG. 4B shows example waveforms that illustrate an example response that can occur when the control module 310 is coupled to the control device in the first configuration and the control module 310 detects no change in the receive voltage when trying to generate the test signal 400 across the electrical terminals 312*c*, 312*d* using the transmit signal $V_{TX}$. In FIG. 4B, the module control circuit 314 may drive the magnitude of the transmit signal $V_{TX}$ low (e.g., to approximately circuit common or zero volts) during the initial pulse period $T_{INIT}$ (e.g., approximately 832 μs) to, for example, generate the test signal 400 across the electrical terminals 312*a*, 312*b* (e.g., generate the initial pulse 410 of the test signal 400 across the electrical terminals 312*a*, 312*b*).

For example, the transmit signal $V_{TX}$ may be high (e.g., at approximately the module supply voltage $V_{CC}$) when not being controlled by the module control circuit 314. The electrical terminals 312*a*, 312*b* may be connected to a link supply voltage $V_{LINK}$ when in the first configuration and/or a communication link capable of supplying power when in the second configuration (e.g., the two-wire control link 349, which may be an idle-high link that may be in the high state when not being controlled by the control module 310). In some examples, the second wired communication circuit 328 may be configured to maintain the two-wire control link 349 in the high state when the transmit signal $V_{TX}$ is not being controlled to the low state by the module control circuit 314 (e.g., in the second configuration shown in FIG. 3B). The second wired communication circuit 328 may be configured to short the electrical terminals 312*a*, 312*b* to drive the magnitude of the voltage across the electrical terminals 312*a*, 312*b* low. After the initial pulse period $T_{INIT}$, the module control circuit 314 may stop driving the magnitude of the transmit signal $V_{TX}$ low (e.g., drive magnitude of the transmit signal $V_{TX}$ high to approximately the module supply voltage $V_{CC}$). The initial pulse period $T_{INIT}$ may be sized according to a communication protocol that is suitable for the two-wire topology, such as the DALI protocol, and for example, may be used to initialize a communication test period (e.g., the length of the test signal 400) between the control module 310 and the control device coupled to the electrical terminals 312*a*, 312*b*.

During and/or after the initial pulse period $T_{INIT}$, the module control circuit 314 may monitor the receive signal $V_{RX}$. As noted above, the magnitude of the receive signal $V_{RX}$ may indicate the magnitude of the voltage across the electrical terminals 312*a*, 312*b*. In FIG. 4B, the receive signal $V_{RX}$ may remain high during (e.g., and after) the initial pulse period $T_{INIT}$. For example, the receive signal $V_{RX}$ may be held up high because the control module may be receiving power (e.g., only power) across the electrical terminals 312*a*, 312*b* (e.g., the control module is wired to the control device in the first configuration shown in FIG. 3A). For instance, the link power supply 335 of the first lighting control device 330 may maintain the voltage across the electrical terminals 312*a*, 312*b*, and thus the receive signal $V_{RX}$, high even when the module control circuit 314 drives the transmit signal $V_{TX}$ low during the initial pulse period $T_{INIT}$ (e.g., without tripping an internal power limit and/or current limit of the link power supply 335).

The module control circuit 314 may determine that the control module 310 is coupled to the control device in the first configuration based on the magnitude of the receive signal $V_{RX}$ staying high during the initial pulse period $T_{INIT}$. For example, if the module control circuit 314 drives the transmit signal $V_{TX}$ low during the initial pulse period $T_{INIT}$ and the magnitude of the receive signal $V_{RX}$ does not respond accordingly (e.g., the magnitude of the receive signal $V_{RX}$ stays in the same state—held high at approximately the module supply voltage $V_{CC}$), the module control circuit 314 may determine that the control module 310 is coupled to the control device in the first configuration (e.g., coupled to the first lighting control device 330 as shown in FIG. 3A), such as via the four-wire control link 339 where the electrical terminals 312*a*, 312*b* are used for power (e.g., only power) and the electrical terminals 312*c*, 312*d* are used for communication. Accordingly, the module control circuit 314 may determine to communicate with the control device using the electrical terminals 312*c*, 312*d*, e.g., in the four-wire topology.

However, if the module control circuit 314 drives the magnitude of the transmit signal $V_{TX}$ low during the initial pulse period $T_{INIT}$ and the magnitude of the receive signal $V_{RX}$ does respond accordingly (e.g., the receive signal $V_{RX}$ goes to the low state), the module control circuit 314 may determine that the control module 310 may be, but is not necessarily, coupled to the control device in the second configuration (e.g., coupled to the first lighting control device 330 as shown in FIG. 3B), such as via the two-wire control link 349. Since it is not conclusive, the module control circuit 314 may continue to generate the test pulse 400 and monitor how the magnitude of the receive signal $V_{RX}$ responds.

FIG. 4C shows example waveforms that illustrate an example response when control module 310 is coupled to the control device in the first configuration and an internal power limit and/or current limit of a link power supply in the control device (e.g., the link power supply 335) trips in response to the test signal 400, which in turn may cause the control module 310 to become unpowered. In some instances, the magnitude of the voltage across the control link may fall to approximately circuit common or zero volts in response to the module control circuit 314 driving the transmit signal $V_{TX}$ low during the initial pulse period $T_{INIT}$ (e.g., when in the first configuration as shown in FIG. 3A). For example, the module control circuit 314 may drive the transmit signal $V_{TX}$ low during the initial pulse period $T_{INIT}$, and the transmit signal $V_{TX}$ may not return to the high state at the end of the initial pulse period $T_{INIT}$ because an internal power limit and/or current limit of the link power supply 335 of the first lighting control device 330 may trip, which may cause the magnitude of the receive signal $V_{RX}$ to drop to approximately zero volts and thus cause the control module 310 to lose power.

Once power is restored, the module control circuit 314 may determine (e.g., based on a test attempt flag that was set prior to the initial pulse period $T_{INIT}$) that the control module 310 lost power while performing the configuration procedure. Since the control module 310 lost power while performing the configuration procedure, the module control circuit 314 may determine that the control module 310 is coupled to a control device in the first configuration via a four-wire control link (e.g., coupled to the first lighting control device 330 via the four-wire control link 339) where the electrical terminals 312a, 312b are used for power (e.g., only power) and the electrical terminals 312c, 312d are used for communication. Accordingly, the module control circuit 314 may determine to communicate with the control device via the first wired communication circuit 326 using the four-wire topology (e.g., and according to the 0-10V control protocol or the RS-485 digital communication protocol).

FIG. 4D shows example waveforms that illustrate an example response when control module 310 is coupled to the control device in the first configuration and an internal power limit and/or current limit of a link power supply in the control device (e.g., the link power supply 335) trips in response to the test signal 400, which in turn may cause the control module 310 to become unpowered. The module control circuit 314 may drive the transmit signal $V_{TX}$ low (e.g., short the transmit signal $V_{TX}$) during the initial pulse period $T_{INIT}$, and the receive signal $V_{RX}$ may follow. For example, the receive signal $V_{RX}$ may go low (e.g., to approximately zero volts) during the initial pulse period $T_{INIT}$, and then return high after the initial pulse period $T_{INIT}$ is complete. After the initial pulse period $T_{INIT}$, the module control circuit 314 may continue to generate the test signal across the electrical terminals 312a, 312b using the transmit signal $V_{TX}$. For example, the module control circuit 314 may control the transmit signal $V_{TX}$ to cause the second wired communication circuit 328 to transmit a query message 420 during a first query message period $T_{QM1}$. The query message 420 may be defined by the communication protocol as being suitable for the two-wire topology. Since the module control circuit 314 is controlling the transmit signal $V_{TX}$ to control the voltage across the electrical terminals 312a, 312b, and the magnitude of the receive signal $V_{RX}$ indicates the magnitude of the voltage across the electrical terminals 312a, 312b, the receive signal $V_{RX}$ may be a scaled version of (e.g., indicative of) the query message 420 during the first query message period $T_{QM1}$.

However, at some point during or immediately after the first query message period $T_{QM1}$, the internal power limit and/or current limit of the link power supply 335 of the first lighting control device 330 may trip, which may cause the voltage across the electrical terminals 312a, 312b to fall to approximately zero volts. As noted herein, if the magnitude of the voltage across the electrical terminals 312a, 312b falls to approximately zero volts, the control module 310 may lose power and shut down. In some examples, the internal power limit and/or current limit of the link power supply 335 of the first lighting control device 330 may not trip during the initial pulse period $T_{INIT}$, but the internal power limit and/or current limit of the link power supply 335 may trip during the first query message period $T_{QM1}$, which may cause the control module 310 to lose power. Once power is restored, the control module 310 may determine (e.g., based on the test attempt flag that was set prior to the initial pulse period $T_{INIT}$) that the control module 310 lost power while performing the configuration procedure. Since the control module 310 lost power while performing the configuration procedure, the module control circuit 314 may determine that it is coupled to a control device in the first configuration via a four-wire control link (e.g., coupled to the first lighting control device 330 via the four-wire control link 339) where the electrical terminals 312a, 312b are used for power (e.g., only power) and the electrical terminals 312c, 312d are used for communication. Accordingly, the module control circuit 314 may determine to communicate with the control device via the first wired communication circuit 326 using the four-wire topology.

FIG. 4E shows example waveforms that illustrate an example response when control module 310 is coupled to the control device in the first configuration and the control module 310 does not lose power and does not receive a response message from the control device in response to the test signal 400. The module control circuit 314 may drive the transmit signal $V_{TX}$ low during the initial pulse period $T_{INIT}$, and may cause the second wired communication circuit 328 to transmit the query message 420 during the first query message period $T_{QM1}$. During the query message period $T_{QM1}$, the receive signal $V_{RX}$ may be a scaled version of (e.g., indicative of) the query message 420 during the first query message period $T_{QM1}$. After the first query message period $T_{QM1}$, the module control circuit 314 may monitor the receive signal $V_{RX}$ during a first response message period $T_{RM1}$ for a test response (e.g., a response message).

A control device that is coupled electrical terminals 312a, 312b and is configured to communicate via the two-wire control link 349 may be configured to transmit the response message in response to receiving the query message 420 from the control module 310. The response message may be a message that is defined by the communication protocol that is suitable for the two-wire topology. In some examples, the response message may be a pattern, such as a high and low pattern that is sent in response to the reception of a query message during the first response message period $T_{RM1}$. Thus, receiving a response message during the first response message period $T_{RM1}$ after the control module 310 transmits a query message 420 during first query message period $T_{QM1}$ may indicate that the control module is wired to the control device via the two-wire topology (e.g., via the two-wire control link 349 in the first configuration shown in FIG. 3B).

However, the receive signal $V_{RX}$ may remain high during the first response message $T_{RM1}$ as shown in FIG. 4E. As such, the module control circuit 314 may determine that it has not successfully received a response message and/or determine that the control device may not be configured to communicate according to the two wire-topology. Nonetheless, in some examples, the module control circuit 314 may re-attempt to garner a response message from the control device by transmitting a subsequent query message during one or more subsequent query message periods. For example, the module control circuit 314 may cause the second wired communication circuit 328 to transmit a second query message 422 during a second query message period $T_{QM2}$. During the second query message period $T_{QM2}$, the receive signal $V_{RX}$ may be the same as the query message created by the module control circuit 314 using the transmit signal $V_{TX}$ during the second query message period $T_{QM2}$. After the second query message period $T_{QM2}$, the module control circuit 314 may monitor the receive signal $V_{RX}$ for a response message during a second response message period $T_{RM2}$. However, the receive signal $V_{RX}$ may remain high during the second response message period $T_{RM2}$ as in FIG. 4E. As such, the module control circuit 314 may determine that it did not receive a response message and/or that the control device is configured for the four-wire topology. It should be appreciated that, in some examples, the module control circuit 314 may generate any number of query messages during respective query message periods without receiving a response message before the module control circuit 314 determines that the control device is configured for the four-wire topology.

Accordingly, the module control circuit 314 may determine that the control module 310 is coupled to a control device in the first configuration via a four-wire control link (e.g., the first lighting control device 330 via the four-wire control link 339) where the electrical terminals 312*a*, 312*b* are used for power (e.g., only power) and the electrical terminals 312*c*, 312*d* are used for communication. Therefore, the module control circuit 314 may determine to communicate with the control device using the communication protocol that is applicable to the four-wire topology.

FIG. 4F shows example waveforms that illustrate an example response when control module 310 is coupled to the control device in the second configuration (e.g., as shown in FIG. 3B) and the control module 310 receives at least one response message to one or more transmitted query messages. The module control circuit 314 may drive the transmit signal $V_{TX}$ low during the initial pulse period $T_{INIT}$ and may cause the second wired communication circuit 328 to transmit a query message during the first query message period $T_{QM1}$. After the first query message period $T_{QM1}$, the module control circuit 314 may monitor the receive signal $V_{RX}$ for a response message during the first response message period $T_{RM1}$. In FIG. 4F, the module control circuit 314 may receive a response message during the first response message period $T_{RM1}$. As such, the module control circuit 314 may determine that the control modules 310 is coupled to a control device in the second configuration via the two-wire control link (e.g., coupled to the second lighting control device 340 via the two-wire control link 349) where the electrical terminals 312*a*, 312*b* are used for power and communication. Accordingly, the module control circuit 314 may determine to communicate with the control device using the communication protocol that is suitable for the two-wire topology. Further, in some examples, the control module 310 may determine that the electrical terminals 312*c*, 312*d* are unused and/or may disable the first wired communication circuit 326.

FIG. 4G shows example waveforms that illustrate an example response when control module 310 is coupled to the control device in the second configuration (e.g., as shown in FIG. 3B) and the control module 310 receives colliding response messages during the first response message period $T_{RM1}$. The module control circuit 314 may drive the transmit signal $V_{TX}$ low during the initial pulse period $T_{INIT}$, and may cause the second wired communication circuit 328 to transmit a query message using the transmit signal $V_{TX}$ during the first query message period $T_{QM1}$. After the first query message period $T_{QM1}$, the module control circuit 314 may monitor the receive signal $V_{RX}$ for a response message during the first response message period $T_{RM1}$. The module control circuit 314 may detect colliding test responses (e.g., colliding response messages) during the first response message period $T_{RM1}$ as shown in FIG. 4G.

For example, the control module may be coupled to more than one control device across the electrical terminals 312*a*, 312*b*. The module control circuit 314 may determine that the magnitude of the receive signal $V_{RX}$ is changing between the low state and the high state, but the receive signal $V_{RX}$ does not indicate a response message that is in accordance with the communication protocol that is suitable for the two-wire topology (e.g., messages from the more than one control device have collided). Since the module control circuit 314 detects the collided messages during the first response message period $T_{RM1}$ (e.g., the control devices are attempting to transmit respective responses messages to the control module 310), the module control circuit 314 may determine that the control module 310 is coupled to multiple control devices in the second configuration via a two-wire control link (e.g., coupled to one or more of the second lighting control device 340 via the two-wire control link 349) where the electrical terminals 312*a*, 312*b* are used for power and communication. Accordingly, the module control circuit 314 may determine to communicate with the one or more control devices using the communication protocol that is suitable for the two-wire topology. Further, in some examples, the module control circuit 314 may determine that the electrical terminals 312*c*, 312*d* are unused and/or may disable the first wired communication circuit 326.

FIG. 4H shows example waveforms that illustrate an example response when control module 310 is coupled to the control device in the second configuration (e.g., as shown in FIG. 3B) and the control module 310 receives at least one response message to one or more transmitted query messages. Referring to FIG. 4H, the module control circuit 314 may drive the transmit signal $V_{TX}$ low during the initial pulse period $T_{INIT}$, and may cause the second wired communication circuit 328 to transmit a query message using the transmit signal $V_{TX}$ during the first query message period $T_{QM1}$. After the first query message period $T_{QM1}$, the module control circuit 314 may monitor the receive signal $V_{RX}$ for a response message during the first response message period $T_{RM1}$. The module control circuit 314 may determine that the receive signal $V_{RX}$ remains high during the first response message period $T_{RM1}$. As such, the module control circuit 314 may determine that it has not successfully received a response message in response to the query message transmitted during the first query message period $T_{QM1}$. Nonetheless, the module control circuit 314 may re-attempt to garner a response message from the control device by sending a second query message during a second query message period $T_{QM2}$. After the second query message period $T_{QM2}$, the module control circuit 314 may monitor the receive signal $V_{RX}$ for a response message during a second response message period $T_{RM2}$.

In FIG. 4H, the module control circuit 314 may receive a test response during the second response message period $T_{RM2}$. As such, the module control circuit 314 may determine that the control module 310 is coupled to a control device in the second configuration via the two-wire control link (e.g., coupled to the second lighting control device 340 via the two-wire control link 349) where the electrical terminals 312*a*, 312*b* are used for power and communication. Accordingly, the module control circuit 314 may determine to communicate with the control device using the communication protocol that is suitable for the two-wire topology. Further, in some examples, the module control circuit 314 may determine that the electrical terminals 312*c*, 312*d* are unused and/or may disable the first wired communication circuit 326. It should be noted that, in some examples, the module control circuit 314 may cause the second wired communication circuit 328 to transmit any number of query messages in an attempt to elicit the transmission of a response message from a control device coupled to the electrical terminals 312*a*, 312*b*.

FIG. 4I shows example waveforms that illustrate an example response when control module 310 is coupled to the control device in the second configuration (e.g., as shown in FIG. 3B) and the control module 310 receives colliding response messages during the second response message period $T_{RM2}$. The module control circuit 314 may drive the transmit signal $V_{TX}$ low during the initial pulse period $T_{INIT}$, and may cause the second wired communication circuit 328 to transmit a query message using the transmit signal $V_{TX}$ during the first query message period $T_{QM1}$. After the first query message period $T_{QM1}$, the module control circuit 314 may monitor the receive signal $V_{RX}$ for a response message during the first response message period $T_{RM1}$. The module control circuit 314 may determine that the magnitude of the receive signal $V_{RX}$ remains high during the first response message period $T_{RM1}$ as shown in FIG. 4I. As such, the module control circuit 314 may determine that it has not successfully received a response message to the query message transmitted during the first query message period $T_{QM1}$. Nonetheless, the module control circuit 314 may re-attempt to garner a response message from the control device by transmitting a second query message during a second query message period $T_{QM2}$. After the second query message period $T_{QM2}$, the module control circuit 314 may monitor the receive signal $V_{RX}$ for a response message during a second response message period $T_{RM2}$.

For example, the control module may be coupled to more than one control devices across the electrical terminals 312*a*, 312*b*. Since the receive signal $V_{TX}$ does not indicate a response message that is in accordance with the communication protocol that is suitable for the two-wire topology (e.g., messages from the more than one control device have collided). Since the module control circuit 314 detects the collided messages during the first response message period $T_{RM1}$ (e.g., the control devices are attempting to transmit respective responses messages to the control module 310), the module control circuit 314 may determine that the control module 310 is coupled to control devices in the second configuration via the two-wire control link (e.g., coupled to one or more of the second lighting control device 340 via the two-wire control link 349) where the electrical terminals 312*a*, 312*b* are used for power and communication. Accordingly, the module control circuit 314 may determine to communicate with the one or more control devices using the communication protocol that is suitable for the two-wire topology. Further, in some examples, the module control circuit 314 may determine that the electrical terminals 312*c*, 312*d* are unused and/or may disable the first wired communication circuit 326.

In summary, the module control circuit 314 of the control module 310 may generate the test signal 400 (FIGS. 4B-4I) across the electrical terminals 312*a*, 312*b* during the configuration procedure to determine whether the control module 310 is coupled to a control device in the first configuration or the second configuration (e.g., and whether the control module can communicate with the control device using a four-wire or two-wire topology). The module control circuit 314 may be configured to determine that the control module 310 is coupled in the four-wire topology (e.g., in the first configuration as shown in FIG. 3A) in response to detecting that the magnitude of the receive signal $V_{RX}$ does not change during the initial pulse period $T_{INIT}$ of the test signal 400 (e.g., as shown in FIG. 4B), determining that the control module 310 lost power while executing the configuration procedure (e.g., as shown in FIGS. 4C-4D), and/or not receiving a response message to one or more transmitted query messages (e.g., as shown in FIG. 4E). In addition, the module control circuit 314 may be configured to determine that the control module 310 is coupled in the two-wire topology (e.g., in the second configuration as shown in FIG. 3B) in response to detecting at least one response message to one or more transmitted query messages (e.g., as shown in FIGS. 4F and 4H) and/or determining that there has been a collision of response messages after the transmission of one or more query messages (e.g., as shown in FIGS. 4G and 4I).

Figure 5:
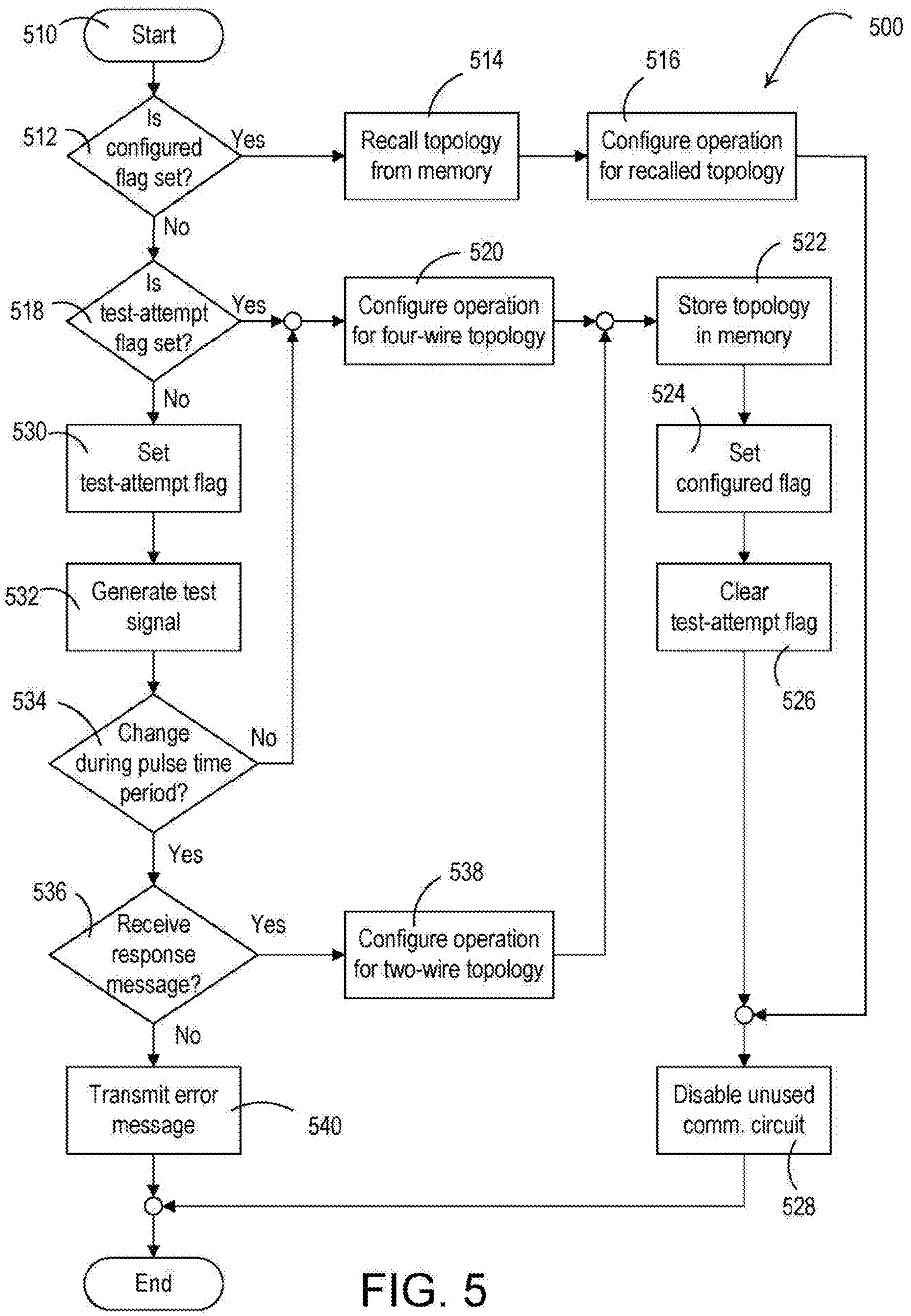
FIG. 5 is a flowchart of an example procedure performed by a control module to determine whether the control module is coupled to one or more control devices in the first configuration or the second configuration.

FIG. 5 is a flowchart of an example procedure 500 performed by a control module (e.g., a control module 120*a*-120*d*, the control module 200, and/or the control module 310) to determine whether the control module is coupled to at least one control device in the first configuration or the second configuration. As described herein, the control module may be coupled to the control device in the four-wire topology (e.g., in the first configuration as shown in FIG. 3A) and/or the two-wire topology (e.g., in the second configuration as shown in FIG. 3B). A control circuit (e.g., the module control circuit 314) may be configured to perform the procedure 500 to detect (e.g., automatically detect) the wiring topology of a control link (e.g., the control link 339 or the control link 349) used to connect the control device to a connector (e.g., the connector 312) of the control module. During the procedure 500, the control circuit may configure the control module for operation in the four-wire topology or the two-wire topology based whether the control module is coupled to the control device in the first configuration or the second configuration, respectively. The control circuit may perform the procedure 500 when first turning on (e.g., a power up event), in response to a reboot (e.g., a power-cycling event), and/or in response to detecting that a new control device has just been coupled to the connector.

As noted above, the control circuit may be configured to generate a test signal (e.g., the test signal 400) across electrical terminals (e.g., the electrical terminals 312*a*, 312*b*) that allow the control module to receive power as well as communicate with the control device (e.g., as with the two-wire topology in the second configuration as shown in FIG. 3B) to determine whether the control module is connected to the control device using a two-wire topology or a four-wire topology. Prior to the test signal, the control circuit may set a test-attempt flag, which may indicate whether the control circuit has previously executed the procedure 500, but did not configure the control module for operation in the first configuration or the second configuration (e.g., did not complete the procedure 500). For instance, as noted above, the generation of the test signal across the electrical terminals may cause the control module to lose power (e.g., as a result of an internal power limit and/or current limit of a link power supply of the control device(s) tripping). As such, when the control module regains power, the control circuit may determine that the test-attempt flag was set, which may cause the control circuit to determine that the control module lost power while executing the procedure 500 and thus configure the control module for operation using the four-wire topology. As such, the control circuit may be configured to detect instances where attempted communication according to a communication protocol that is suitable for the two-wire topology (e.g., shorting of the control link in order to attempt to communicate) causes the control module to lose power, and in response, configure the control module for operation in the four-wire topology. Further, the control circuit may set a configured flag that indicates whether or not the control device has already been configured to operate in the two-wire topology or the four-wire topology. The control circuit may store in memory the topology to which the control module has been configured.

The procedure 500 may begin at 510. At 512, the control circuit may determine whether the configured flag is set. The configured flag may indicate whether or not the control device has already been configured in the two-wire topology or the four-wire topology. If the control circuit determines that the configured flag is set at 512, the control circuit may recall a previously-configured topology from memory at 514 and configure the control module for operation in the recalled wiring topology at 516, before the procedure 500 may exit.

If the configured flag is not set 512, the control circuit may determine whether the test-attempt flag has been set at 518.

The test-attempt flag may indicate whether or not the control circuit has previously attempted to execute the procedure 500 and lost power while previously executing the procedure 500. For example, as described with reference to FIGS. 4A-4I, the control circuit may be configured to generate the test signal across the electrical terminals, where the test signal is used to determine whether the control module is wired in the four-wire topology or the two-wire topology. Before attempting to generate the test signal, the control circuit may set the test-attempt flag. Further, when generating the test signal, the control circuit may adjust the magnitude of a voltage across the electrical terminals (e.g., the electrical terminals by which the control module receives power and also may communicate with the control module in the second configuration, such as the electrical terminals 312*a*, 312*b*). In some examples, the control circuit may adjust the magnitude of the transmit signal $V_{TX}$ (e.g., drive the magnitude of the transmit signal $V_{TX}$ low), which may cause a communication circuit (e.g., the second wired communication circuit 328) to control the magnitude of the voltage across the electrical terminals to be driven low. For instance, such as when the control module is wired in the four-wire topology and the control circuit controls the transmit signal $V_{TX}$ low to pull the magnitude of the voltage across the electrical terminals low, an internal power limit and/or current limit of a link power supply of the control device (e.g., the link power supply 335 of the first lighting control device 330) may trip, which may cause the control module to lose power and shut down (e.g., as shown in FIGS. 4C and 4D). Thus, determining that the test-attempt flag is set at 518 may indicate that the control module is wired to the control device in the four-wire topology (e.g., via the four-wire control link 339 in the first configuration shown in FIG. 3A).

As such, if the control circuit determines that the test-attempt flag is set at 518, the control circuit may configure the control module for operation in the four-wire topology at 520. For example, if the control circuit determines that the test attempt flag was set at 518, the control circuit may determine that the control module just powered back up after an interruption in power delivery from the link power supply due to the generation of the test signal causing the internal power limit and/or current limit of the link power supply to trip. The control circuit may store the determined topology (e.g., the four-wire topology) at 522, set the configured flag at 524 to indicate that the control module has been configured with a topology, and clear the test-attempt flag at 526. In some examples, the control circuit may store the configured topology as part of the configured flag. Further, in some examples, the control circuit may not maintain the configured flag, but may at 512 simply check a location in memory (e.g., to which the topology is stored at 522) to determine if the control module has been previously configured with one of the topologies.

At 528, the control circuit may disable a communication circuit that may be unused in the configured topology (e.g., the second communication circuit 328), and the procedure 500 may exit. For example, if the configured flag indicates that the control device is configured for the four-wire topology, the control circuit may disable the second wired communication circuit at 528 (e.g., the second wired communication circuit 328). If the configured flag indicates that the control device is configured for the two-wire topology, the control circuit may disable the first wired communication circuit at 528 (e.g., the first wired communication circuit 326).

In some examples, the control circuit may determine whether the test-attempt flag is set to a predefined value (e.g., a counter value) prior to proceeding from 518 to 520. For example, if the control circuit determines that the test-attempt flag is set at 518, the control circuit may determine whether a value of the test-attempt flag is equal to the predetermined value (e.g., three). If the control circuit determines that the value of the test-attempt flag is equal to the predetermined value, the control circuit may configure the control module for operation in the four-wire topology at 520. If control circuit determines that the value of the test-attempt flag is not equal to the predetermined value, the control circuit may increase the test-attempt flag by one and proceed to 532. The control circuit may use a counter value for the test-attempt flag to, for example, reduce the possibility that a random power outage or intentional power cycle of the control module could cause an incorrect load type detection.

If the control circuit determines that the test-attempt flag was not set at 514, the control circuit may prepare to generate the test signal across the electrical terminals by setting the test-attempt flag at 530. For example, if the control circuit has not been configured (e.g., does not have a stored indication of the wiring topology fused by the control devices coupled to the control module) as indicated via the configured flag, and if the control circuit has not already attempted to configure the control module as indicated by the test attempt flag not being set, the control circuit may attempt to configure the control module by generating the test signal across the electrical terminals.

At 532, the control circuit may begin to generate the test signal across the electrical terminals. The test signal may include an initial pulse (e.g., the initial pulse 410) and/or at least one message (e.g., one or more query messages 420, 422) that may be used to determine whether the control module to the control device is wired in the two-wire topology. The control circuit may control a magnitude of the voltage across the electrical terminals (e.g., using the second wired communication circuit 328). For instance, as described with reference to FIGS. 4B-4I, the control circuit may drive the transmit signal $V_{TX}$ low (e.g., to approximately zero volts) during an initial pulse period $T_{INTL}$ (e.g., approximately 832 μs in length) to generate the initial pulse in the test signal across the electrical terminals. For example, the voltage across the electrical terminals may be high (e.g., at approximately the bus supply voltage $V_{BUS}$) when not being controlled by the control circuit. In some examples, the bus power supply 306 may be configured to maintain the voltage across the electrical terminals in high (e.g., at approximately the bus supply voltage $V_{BUS}$) when the voltage across the electrical terminals is not being driven low by the second wired communication circuit 328 (e.g., while the control circuit is driving the magnitude of the transmit signal $V_{TX}$ high). The second wired communication circuit 328 may be configured to short the electrical terminals to drive the voltage across the electrical terminals low. Further, in such examples, after the control circuit drives the transmit signal $V_{TX}$ low during the initial pulse period $T_{INTL}$, the control circuit may generate one or more messages (e.g., a query messages) (e.g., as described with reference to FIGS. 4B-4I).

At 534, the control circuit may determine whether the voltage across the electrical terminals changes during the initial pulse period $T_{INTL}$. When the control module is wired in the four-wire topology and the control circuit controls the transmit signal $V_{TX}$ low to pull the magnitude of the voltage across the electrical terminals low to generate the initial pulse of the test signal, a link power supply of the control device (e.g., the link power supply 335 of the first lighting control device 330) may hold the magnitude of the voltage across the terminals high (e.g., at the link supply voltage $V_{LINK}$) during the initial pulse period $T_{INTL}$ (e.g., if an internal power limit and/or current limit of the link power supply does not trip during the initial pulse period $T_{INTL}$) (e.g., as shown in FIG. 4B). Thus, determining that the voltage across the electrical terminals does not change during the initial pulse period $T_{INTL}$ may indicate that the control module is wired to the control device in the four-wire topology (e.g., via the four-wire control link 339 in the first configuration shown in FIG. 3A). If the control circuit determines that the voltage across the electrical terminals did not change during the initial pulse period $T_{INTL}$ at 534, the control circuit may configure the control module for operation in the four-wire topology at 520, store the determined topology (e.g., the four-wire topology) at 522, set the configured flag at 524, clear the test-attempt flag at 526, and disable a communication circuit that may be unused in the configured topology (e.g., the second communication circuit 328) at 528, before the procedure 500 exits.

If the control circuit determines that the voltage across the electrical terminals changed during the initial pulse period $T_{INTL}$ at 534, the control circuit may determine at 536 whether the control module detects a response (e.g., a test response, such as a response message and/or a collision of response message) to the query messages of the test signal across the electrical terminals (e.g., a response that indicates that the control module is coupled to the control device in the two-wire topology). For instance, the control circuit may detect the response by monitoring the magnitude of the receive signal $V_{RX}$ during one or more response message periods (e.g., the first response message period $T_{RM1}$ and/or the second response message period $T_{RM2}$). For example, the detected response to the query messages of the test signal may be a response message transmitted from a control device in response to the reception of at least one of the query messages of the test signal (e.g., as shown in FIGS. 4F and 4H) and/or an indication of a collision of response messages transmitted by multiple control devices (e.g., as shown in FIGS. 4G and 4I). Further, as noted above, the control circuit may be configured to generate any number of query messages before proceeding past 536.

If the control circuit determines that the control module detects a response (e.g., a test response, such as a response message or a collision of response messages) at 536, the control circuit may configure the control module operation in the two-wire topology at 538. For example, after configuring the control module for operation in the two-wire topology at 538, the control circuit may store the determined topology (e.g., the two-wire topology) at 522, set the configured flag at 524 to indicate that the control module has been configured with a topology, and clear the test-attempt flag at 526. Further, the control circuit may at 528 disable a communication circuit that may be unused in the configured topology (e.g., the first wired communication circuit 326), and the procedure 500 may exit.

If the control circuit determines that the control module does not receive a response at 536, the control circuit may transmit an error (e.g., fault) message to an external device at 540, such as the system controller 140 and/or the network device 150 (e.g., via the wireless communication circuit 316), before the procedure 500 exits. The error message may include an indication that the control module was not successful in configuring the control module (e.g., determining to operate according to one of the four-wire topology and the two-wire topology). For example, an error message may be displayed (e.g., on the network device 150 and/or other processing device having a graphical display). In response to viewing the error message, a user may be configured to manually select the topology for the control module. For example, the user may be configured to select the topology by interacting with a graphical user interface of the network device 150 and/or by actuating one or more buttons on the control module.

Further, it should be appreciated that in some examples the control module may lose power in response to the control circuit generating the test signal across the electrical terminals at 532. As noted above, when the control module is connected to the control device(s) using the four-wire topology, and the control circuit generates the test signal across the electrical terminals (e.g., the electrical terminals at which the control module receives power), an internal power limit and/or current limit of the power supply of the control device may be exceeded, which may cause the control module to lose power. In such examples, since the test-attempt flag was set at 530 prior to the control circuit generating the test signal at 534, when the control module regains power, the control circuit may determine that the test-attempt flag was set at 518, which may cause the control circuit to configure the control module using the four-wire topology at 520. As such, the control circuit may be configured to detect instances where attempted communication according to a communication protocol that is suitable for the two-wire topology causes the control module to lose power, and in response, configure to the control module for operation in the four-wire topology.

In addition to what has been described herein, the methods and systems may also be implemented in a computer program(s), software, or firmware incorporated in one or more computer-readable media for execution by a computer (s) or processor(s), for example. Examples of computer-readable media include electronic signals (transmitted over wired or wireless connections) and tangible/non-transitory computer-readable storage media. Examples of tangible/non-transitory computer-readable storage media include, but are not limited to, a read only memory (ROM), a random-access memory (RAM), removable disks, and optical media such as CD-ROM disks, and digital versatile disks (DVDs).

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A control module for controlling a control device of a load control system, wherein the control device is configured to control an electrical load, the control module comprising:

a first electrical terminal, a second electrical terminal, a third electrical terminal, and a fourth electrical terminal;

a first wired communication circuit coupled to the third and fourth electrical terminals and configured to communicate with the control device;

a second wired communication circuit coupled to the first and second electrical terminals and configured to communicate with the control device;

a control circuit; and a power supply configured to receive power via the first and second electrical terminals and generate a supply voltage for powering the control circuit;

wherein the control circuit is configured to:

control a magnitude of a voltage across the first and second electrical terminals using the second wired communication circuit; and determine whether to communicate with the control device using the first wired communication circuit or the second wired communication circuit based on a response caused by the control of the magnitude of the voltage across the first and second electrical terminals.

2. The control module of claim 1, wherein the response is indicated by a magnitude of a voltage across the first and second electrical terminals, a loss of power at the control module, or a reception of a response message via the first and second electrical terminals.

3. The control module of claim 1, wherein the second wired communication circuit is configured to short the first and second electrical terminals to control the magnitude of the voltage at the first and second electrical terminals.

4. The control module of claim 1, wherein the control circuit is configured to:

receive a response message from the control device via the first and second electrical terminals; and determine to communicate with the control device using the second wired communication circuit based on the reception of the response message.

5. The control module of claim 4, wherein the control circuit is configured to control the magnitude of the voltage across the first and second electrical terminals using the second wired communication circuit to generate a test signal; and wherein the test signal comprises a query message, wherein the query message is configured to elicit the response from the control device when the control device is configured to communicate with the control module when wired in a two-wire topology.

6. The control module of claim 5, wherein the control circuit is configured to:

determine to communicate with the control device using the first wired communication circuit in response to a determination that the response message was not received from the control device.

7. The control module of claim 5, wherein the control circuit is configured to transmit an error message to an external device in response to a determination that the response message was not received from the control device, wherein the error message comprises an indication that the control module was not successful in configuring the control device.

8. The control module of claim 1, wherein the control circuit is configured to determine to communicate with the control device using the first wired communication circuit when the control of the magnitude of the voltage across the first and second electrical terminals causes the control module to lose power.

9. The control module of claim 1, wherein the control circuit is configured to set a test-attempt flag prior to the control of the magnitude of the voltage across the first and second electrical terminals; and wherein, when powering up, the control circuit is configured to determine whether the test-attempt flag indicates that the control circuit had lost power in response to the control of the magnitude of the voltage across the first and second electrical terminals.

10. The control module of claim 1, wherein the control circuit is configured to set a configured flag that indicates whether the control circuit is configured to communicate with the control device using the first wired communication circuit or the second wired communication circuit.

11. The control module of claim 1, wherein the control circuit is configured to store in memory an indication of whether to communicate with the control device using the first wired communication circuit or the second wired communication circuit.

12. The control module of claim 1, wherein control of the magnitude of the voltage across the first and second electrical terminals comprises the control circuit generating an initial pulse by attempting to drive the magnitude of the voltage across the first and second electrical terminals low for a period of time.

13. The control module of claim 12, wherein the control circuit is configured to determine to communicate with the control device using the first wired communication circuit when the generation of the initial pulse causes the control module to lose power during the period of time that the control circuit is driving the magnitude of the voltage across the first and second electrical terminals low.

14. The control module of claim 12, wherein the second wired communication circuit is configured to generate a receive signal that indicates the magnitude of the voltage across the first and second electrical terminals, and the control circuit is configured to determine to communicate with the control device using the first wired communication circuit when the magnitude of the receive signal does not change during the period of time that the control circuit is driving the magnitude of the voltage across the first and second electrical terminals low.

15. The control module of claim 1, wherein the control circuit is configured to disable the first wired communication circuit when the control module is configured to communicate with the control device using the second wired communication circuit; and wherein the control circuit is configured to disable the second wired communication circuit when the control module is configured to communicate with the control device using the first wired communication circuit.

16. The control module of claim 1, wherein the control module is configured to communicate with the control device using the second wired communication circuit by transmitting and receiving messages using a DALI communication protocol; and wherein the control module is configured to communicate with the control device using the first wired communication circuit by generating a 0-10V control signal.

17. The control module of claim 1, wherein the control module is configured to communicate with the control device using the second wired communication circuit by transmitting and receiving messages using a DALI communication protocol; and wherein the control module is configured to communicate with the control device using the first wired communication circuit by transmitting and receiving messages using an RS-485 communication protocol.

18. The control module of claim 1, wherein the control module is configured to communicate with the control device using the second wired communication circuit by transmitting and receiving messages using a digital communication protocol; and wherein the control module is configured to communicate with the control device using the first wired communication circuit by generating control signals using an analog control protocol.

19. The control module of claim 1, wherein, when the control module is coupled to the control device using a four-wire topology, the control module is configured to receive power via the first and second electrical terminals and configured to communicate with the control device using the first wired communication circuit via the third and fourth electrical terminals; and wherein, when the control module is coupled to the control device using a two-wire topology, the control module is configured to receive power via the first and second electrical terminals and configured to communicate with the control device using the second wired communication circuit via the first and second electrical terminals.

20. The control module of claim 19, wherein the two-wire topology is defined by both power and communication being provided via the first and second electrical terminals; and wherein the four-wire topology is defined by power being provided via the first and second electrical terminals, and communication being provided via the third and fourth electrical terminals.

* * * * *